United States Patent
Kanai et al.

(10) Patent No.: US 9,498,840 B2
(45) Date of Patent: Nov. 22, 2016

(54) WELDING STRUCTURAL PART AND WELDING METHOD OF THE SAME

(75) Inventors: Takahiko Kanai, Tokyo (JP); Munehisa Hatta, Tokyo (JP); Fumiaki Ikuta, Tokyo (JP); Kazuhiro Kawasaki, Tokyo (JP); Eizaburou Nakanishi, Kanagawa (JP); Masayuki Miyake, Kanagawa (JP); Kotobu Nagai, Ibaraki (JP); Masao Hayakawa, Ibaraki (JP); Takehiko Itagaki, Ibaraki (JP)

(73) Assignees: NETUREN CO., LTD., Tokyo (JP); NATIONAL INSTITUTE FOR MATERIALS SCIENCE, Tsukuba-shi (JP)

( * ) Notice: Subject to any disclaimer, the term of this patent is extended or adjusted under 35 U.S.C. 154(b) by 1220 days.

(21) Appl. No.: 13/388,239
(22) PCT Filed: Jul. 30, 2010
(86) PCT No.: PCT/JP2010/062888
§ 371 (c)(1),
(2), (4) Date: Jan. 31, 2012

(87) PCT Pub. No.: WO2011/013793
PCT Pub. Date: Feb. 3, 2011

(65) Prior Publication Data
US 2012/0129006 A1    May 24, 2012

(30) Foreign Application Priority Data

Jul. 31, 2009    (JP) .................... 2009-180134

(51) Int. Cl.
*B23K 9/28*    (2006.01)
*B23K 11/11*    (2006.01)
(Continued)

(52) U.S. Cl.
CPC .............. *B23K 11/115* (2013.01); *B23K 11/24* (2013.01); *B23K 11/26* (2013.01); *B23K 11/312* (2013.01); *C22C 38/00* (2013.01); *B23K 2201/18* (2013.01); *B23K 2203/04* (2013.01); *Y10T 428/12965* (2015.01)

(58) Field of Classification Search
CPC ..... B23K 11/115; B23K 11/24; B23K 11/26; B23K 11/312; B23K 2201/18; B23K 2203/04; C22C 38/00; Y10T 428/12965
USPC ...... 219/80, 83, 84, 86.1; 148/334; 228/150, 228/153, 265
See application file for complete search history.

(56) References Cited

U.S. PATENT DOCUMENTS 4,732,026 A * 3/1988 Ban .................................. 72/52
4,889,566 A * 12/1989 Okada et al. ................ 148/546
(Continued)

FOREIGN PATENT DOCUMENTS

CN    102227283 A    10/2011
JP    62-24877 A    2/1987
(Continued)

OTHER PUBLICATIONS

Hayakawa et al., "Microstructural analysis of tempered martensite with an atomic force microscope", Materia, The Japan Institute of Metals, vol. 43, No. 9, pp. 717-723, 2004.
(Continued)

*Primary Examiner* — Dana Ross
*Assistant Examiner* — Joseph Iskra
(74) *Attorney, Agent, or Firm* — Westerman, Hattori, Daniels & Adrian, LLP

(57) ABSTRACT

A welding structural part 1 is manufactured by overlapping the surfaces of steel sheets 2, and forming a weld zone by spot welding. The weld zone 3 includes: a weld nugget 4; and a heat affected zone 5 surrounding the weld nugget 4, wherein the hardness in the weld zone increases along an exterior region 6 of the heat affected zone 5 toward the heat affected zone 5, and then decreases along the heat affected zone 5 toward the central region of the weld nugget 4. In the boundary region between the weld nugget 4 and the heat affected zone 5, the weld nugget 4 may have a convex portion 4A bulging into the heat affected zone 5 along the overlapped portion. The steel sheets 2 contain carbon in 0.15 mass % or more.

12 Claims, 24 Drawing Sheets

(51) Int. Cl.
   *B23K 11/24*    (2006.01)
   *B23K 11/26*    (2006.01)
   *B23K 11/31*    (2006.01)
   *C22C 38/00*    (2006.01)

(56) References Cited

U.S. PATENT DOCUMENTS

| | | | | |
|---|---|---|---|---|
| 4,925,500 | A * | 5/1990 | Kishida et al. | 148/602 |
| 2003/0221752 | A1* | 12/2003 | Utsumi et al. | 148/334 |
| 2005/0173031 | A1* | 8/2005 | Hasegawa et al. | 148/546 |
| 2007/0029015 | A1* | 2/2007 | Yoshinaga et al. | 148/533 |
| 2007/0138239 | A1* | 6/2007 | Kumagai et al. | 228/227 |
| 2007/0262056 | A1* | 11/2007 | Schwaegler et al. | 219/83 |

FOREIGN PATENT DOCUMENTS

| | | | |
|---|---|---|---|
| JP | 2-115352 | * | 5/1994 |
| JP | 9-271962 A | | 10/1997 |
| JP | 2001-9573 A | | 1/2001 |
| JP | 2001-105155 A | | 4/2001 |
| JP | 2003-236674 A | | 8/2003 |
| JP | 2005-169429 A | | 6/2005 |
| JP | 2005-211934 A | | 8/2005 |
| JP | 4006513 B2 | | 11/2007 |
| JP | 2007-332457 A | | 12/2007 |
| JP | 2008-229720 | * | 10/2008 |
| JP | 2008-229720 A | | 10/2008 |
| JP | 2009-1839 A | | 1/2009 |
| WO | 2010/038779 A1 | | 4/2010 |

OTHER PUBLICATIONS

Japan Welding Society, "Welding/Joining Handbook", Maruzen, Sep. 30, 1990, pp. 392-398.
International Search Report of PCT/JP2010/062888, mailing date of Nov. 2, 2010.

* cited by examiner

WELDING STRUCTURAL PART AND WELDING METHOD OF THE SAME

TECHNICAL FIELD

The present invention relates to a welding structural part and a welding method of the same. More specifically, the present invention relates to a welding structural part including a highly ductile spot weld zone and a method of welding the structural part.

BACKGROUND ART

Spot welding equipment is used to weld steel sheets overlapped with each other. FIG. 21 is a cross-sectional view illustrating the conventional spot welding of steel sheets 50. As shown in FIG. 21, to perform spot welding of steel sheets 50, an overlapped portion of the steel sheets 50 is sandwiched between a pair of electrodes 52, and a force is applied to the electrodes 52 to pressurize the steel sheets 50 in the direction of the arrow as shown in FIG. 21. A large current on the order of kA is then applied to the electrodes 52 while the pressurized state is maintained to melt the compressed part instantaneously by Joule heating, namely by resistance heating, thus forming a melted mass of a given diameter called a nugget 54 (Non-patent Reference 1, for example). The nugget 54 is also called a weld nugget.

FIG. 22 is a detailed cross-sectional view of a weld zone formed by conventional spot welding. As shown in FIG. 22, a spot weld zone 53 includes the weld nugget 54, a heat affected zone 55 surrounding the weld nugget 54, a corona bond region 57 formed on the boundary between the steel sheets 50, 50 in the heat affected zone 55, and a gap 58 which could be generated on the boundary between the heat affected zone 55 and the steel sheets 50, 50. The heat affected zone 55 is also called HAZ. The corona bond region 57 and the gap 58 are also called a pressure welding zone and a sheet separation tip, respectively.

Furthermore, a sputter 56 may be generated in the gap 58. Steel melted by spot welding extrudes from the weld nugget 54 through the heat affected zone 55 to outside to form the sputter 56 in the gap 58 between the overlapped portion of the steel sheets 50, 50, constituting a part of the weld nugget 54. The sputter 56 is also called an expulsion. As a result of generation of the sputter 56, a blowhole, namely a spherical cavity, may be generated within the weld zone 53, or splashed sputter 56 may be attached to the steel sheets in regions other than the spot weld zone 53. Since the generation of the sputter 56 may result in defects in the painting process to be conducted after the spot welding, it is undesirable. However, generation of the sputter 56 is inevitable at present. If a crack is generated in the corona bond region 57 within the heat affected zone 55 in the spot weld zone 53, the strength of a cross joint, which will be described later, will degrade.

By the way, high-strength steel sheets have recently been used in vehicle production lines as raw materials for vehicle bodies to be spot-welded to reduce the weight of vehicles and ensure safety at the same time.

FIG. 23 is a plan view of samples used for a tensile test to examine the spot weld strength of high-strength steel sheets, where (A) is a lap joint, and (B) is a cross joint. In the lap joint sample as shown in FIG. 23(A), the ends of two rectangular steel sheets 50 in the longitudinal direction are overlapped, and these ends are spot welded. In the cross joint sample as shown in FIG. 23(B), two rectangular steel sheets 50 are crossed to form a shape of a cross, and this cross section is spot-welded. The mostly ellipsoidal portion enclosed by a dotted line is a nugget 54 formed by welding, and the forces 56 applied in a cross tensile test are shown by the arrows.

FIG. 24 illustrates the mode of break of the cross tensile test of the spot weld zone. As shown in FIG. 24, the mode of break is classified into (a) a break of planar fracture in the nugget, (b) a break of plug-like fracture in the nugget, (c) a break of plug-like fracture in the heat affected zone, (d) a matrix break, and (e) a complex type of break not shown in the figure. The complex type of break is a combination of (b) to (d) breaks described above. As the position of break moves from (b) to (d), the cross rupture strength increases.

PRIOR TECHNICAL REFERENCE

Patent Reference

Patent Reference 1: JP2005-211934 A
Patent Reference 2: JP2007-332457 A
Patent Reference 3: JP 4006513 B

Non-Patent Reference

Non-Patent Reference 1: Japan Welding Society, "Welding/Joining Handbook", Maruzen, Sep. 30, 1990, pp. 392-398
Non-Patent Reference 2: M. Hayakawa and S. Matsuoka, "Microstructural analysis of tempered martensite with an atomic force microscope," Materia, The Japan Institute of Metals, Vol. 43, No. 9, pp. 717-723, 2004

SUMMARY OF INVENTION

Problems to be Solved by the Invention

Regarding the spot weld strength of high-strength steel sheets, with the increase in material strength, the tensile strength of the lap joint also increases. Meanwhile, it has been reported that the peel strength of the cross joint rarely increases even if the material strength increases, and rather it becomes more difficult to obtain stable strength. The reason why stable tensile strength cannot be obtained in peeling of a cross joint is simultaneous occurrence of the following:

the degree of concentration of stress on the circumference of circle of the nugget 54 is extremely high, and the increase in the strength of a base material also increases the binding force around the nugget 54.

Under such circumstances, when using steel sheets having high strength for vehicle bodies from the viewpoint of ensuring toughness of weld regions, the amount of carbon is kept at a given level or lower to prevent the weld regions from becoming too hard. By taking structural matter and combination with a mating material into consideration, some restrictions are imposed at present.

Meanwhile, the use of high-strength steel sheets efficiently reduces the weight of vehicle bodies, and so high-strength steel sheets with further improved strength and ductility are desired. By further improving the strength of steel sheets for vehicle bodies, further reduction in weight can be expected. By improving the ductility of steel sheets for vehicle bodies, the formability of hot stamping and the sufficient deformability of products at the time of collision can be ensured. In general, the higher the strength in steel sheets for vehicle bodies is, the lower their ductility tends to be. To improve both strength and ductility of steel sheets for vehicle bodies, it is effective to increase carbon content in materials. However, since the spot weld regions become harder and more brittle in proportion to the carbon content of the spot weld regions, it is difficult to obtain stable and sufficient strength.

Various efforts have been made to improve the strength of spot weld regions by elaborating welding methods. For example, an attempt has been made to conduct tempering by post applying current after a melted joint portion is formed in a desired size. However, in resistance spot welding used to assemble vehicle bodies, it is required to maintain the process time needed for one shot within one second. Consequently, if tempering is performed by post applying current using conventional welding equipment, the effect of tempering is quite limited. Or, to obtain sufficient effect of tempering, a time far exceeding the required process time is necessary. The reason for this is as follows: if tempering is conducted using conventional welding equipment, current is applied only to the center of the nugget directly under the electrodes. In other words, the region requiring the effect of tempering is deviated from the region of major heating.

The spot welding equipment having a spot welder and a high-frequency induction heating means is disclosed in Patent Reference 1. This high-frequency induction heating means includes a heating coil for heating the region to be welded of the work by induction heating and a high-frequency power supply for supplying high-frequency power to the heating coil.

A dual-phase steel having fine crystal grains has been studied as a steel achieving both high strength and toughness, and it was found that the precipitation of carbide was an effective means (See Patent Reference 2). To allow carbide to be precipitated, it is necessary to increase the carbon content in materials. However, if carbon content is too high, the spot weld region becomes too hard, causing embrittlement and thus decreasing the strength of the welded region significantly. Consequently, carbon content of steel sheets for vehicles has been kept to 0.15 mass % or lower. In addition, the shape of electrodes for spot welding and post applying current conditions have also been studied. Studies have found that in a spot weld region formed by energizing electrodes, the spot weld region cools down quickly, and as a result, the microstructure in the heat affected region turns to be martensite. No further studies have been made.

In the conventional spot welding, recovering the strength of a weld zone means recovering the toughness of the weld nugget. In this case, a weakly bonded region called the corona bond exists in the heat affected zone around the nugget. Since the state of bonding of the corona bond is weak, this bonding state has not been regarded as contributing to the bonding strength of the spot weld region. Namely, the hardness of this region was regarded as being determined by material composition of steel sheets, and consequently, an improvement of strength, toughness, and the strength of bonding state of this region have never been attempted.

In view of the problem described above, in order to achieve the first object, the present invention is to provide a welding structural part having a spot weld zone high in strength and toughness, and high fracture strength confirmed by a rupture test such as the cross tensile test. The second object of the present invention is to provide a method of welding such a structural part.

Means for Solving the Problems

To achieve the first object described above, the present invention is to provide a welding structural part comprising steel sheets bonded together by overlapping their surfaces and forming a weld zone by spot welding, characterized in that: the weld zone becomes softer from the edge portion toward the central portion of the bonded part.

Namely, the welding structural part of the present invention comprising steel sheets bonded together by overlapping their surfaces and forming a weld zone by spot welding characterized in that: the weld zone including: a weld nugget; and a heat affected zone surrounding the weld nugget, wherein a hardness on the overlapped surfaces of the steel sheets increases from an exterior region of the heat affected zone toward the heat affected zone, and decreases from the heat affected zone toward a central portion of the weld nugget.

In the above configuration, when the maximum increment in hardness of the steel sheets in the heat affected zone is assumed to be H, the hardness at the central portion of the weld nugget is preferably softer than the hardest part of the heat affected zone by at least ½ of H.

The microstructure of the heat affected zone preferably has a fine dual-phase microstructure consisting of a hard and a soft phases.

The microstructure of the weld nugget preferably is martensite where fine carbides are dispersed.

When particle diameter of the carbide dispersed over the soft area of the weld nugget and the heat affected zone is assumed to be d, and mean spacing of particles as L, a dispersion coefficient of particles of carbide expressed by equation (1) shown below preferably is 0.02 or higher.

$$\text{Dispersion coefficient of particle}=(\text{Square root of particle diameter})/\text{Mean spacing of particles}=(d)^{1/2}/L \qquad (1)$$

The particle diameter of carbide preferably is 10 nm or larger. The particle volume fraction of the carbide may fall within the 1% to 10% range.

The steel sheets in the heat affected zone are preferably bonded by solid-phase bonding. The solid phase bonding of the heat affected zone preferably has bonding strength that allows cracks to run along a region other than the weld nugget, or along a proximity region of the boundary between the weld nugget and the heat affected zone, as a fracture path in a cross tensile test of the weld zone.

The weld nugget preferably has a convex portion bulging into the heat affected zone along the overlapped portion within the boundary region of the weld nugget and the heat affected zone.

The steel sheets preferably contain carbon in 0.15 mass % or more.

As a fracture path in the cross tensile test of the weld zone, a crack preferably runs along a region other than the weld nugget, or along a proximity region of the boundary between the weld nugget and the heat affected zone.

According to the above configuration, a welding structural part having a highly strong and tough spot weld zone, and high fracture strength confirmed by a rupture test such as cross tensile test, can be obtained.

To achieve the second object described above, the present invention is to provide a welding method comprising: sandwiching steel sheets whose surfaces are overlapped with each other with a pair of electrodes; and applying DC power, or a power having a first frequency, between the pair of electrodes to form a weld zone, thereby spot-welding the steel sheets, and is characterized in that: applying a power having a second frequency that is higher than the first frequency to the electrodes; and heating a proximity of the outer periphery of the region where the steel sheets contact the pair of electrodes and a bonded edge region where the weld zone overlaps with the steel sheets by the power having the second frequency.

In another aspect, the present invention is to provide a welding method comprising: sandwiching steel sheets whose surfaces are overlapped with each other with a pair of electrodes; applying DC power, or a power having a first frequency, between the pair of electrodes; and spot-welding the steel sheets by a weld zone having a weld nugget and a heat affected zone surrounding the weld nugget, and is characterized in that: applying a power having a second frequency that is higher than the first frequency to the electrodes, and heating a proximity of the outer periphery of the region where the steel sheets contact the pair of electrodes and a bonded edge region where the outer periphery of the heat affected zone overlaps with the steel sheets by the power having the second frequency.

In the above configuration, the power having the second frequency may be applied after performing spot welding using the DC power or power having the first frequency.

According to the above configuration, a welding structural part having high strength and toughness can be manufactured by sandwiching steel sheets overlapped with each other with a pair of electrodes, forming a weld nugget by resistance heating, and heating the peripheral region of the weld nugget by DC power or the high-frequency power having the higher frequency than the low-frequency power.

Effects of the Invention

According to the present invention, a welding structural part having a highly strong and tough spot weld zone, and high fracture strength confirmed by a cross tensile test, and a method of welding can be provided.

DESCRIPTION OF CODES

Figure 1:
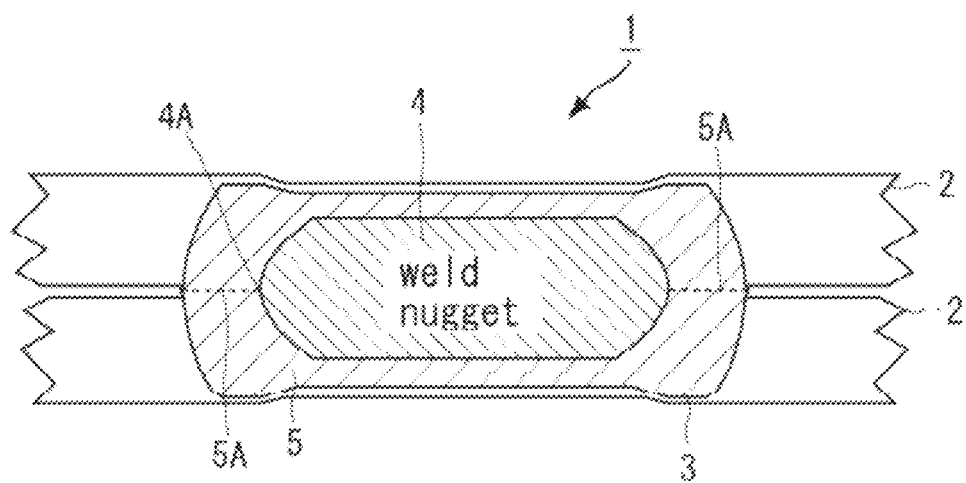
FIG. 1 is a cross-sectional view illustrating a typical microstructure of a spot weld zone of a structural part according to the embodiment of the present invention.

1: Welding structural part
2: Steel sheet
2A: Inside the circle
2B, 2C: Ring-shaped region
3: Spot weld zone
3A: Center portion
3B: Bonded edge
4: Weld nugget
4A: Convex portion of the weld nugget
5: Heat affected zone
5A: Solid-phase bonding
6: Exterior region of the heat affected zone
8: Carbide
10: Welding equipment
10A: Welding circuit of the welding equipment
10B: Welding unit of the welding equipment
12: Gun arm
12A: Upper portion of the gun arm
12B: Upper portion of the gun arm
13: Electrode support
14: Electrode
15: Floating inductance
16: Low-frequency power supply
17: Matching capacitor
18: High-frequency power supply
20: Power control unit
21: Bypass capacitor 22: Commercial power supply
23: Inductance for interrupting high-frequency current
24: Low-frequency power control unit
26: Welding transformer
28: Oscillator
30: Matching transformer
32: High-frequency current
34: Low-frequency current

MODES FOR CARRYING OUT THE INVENTION

The embodiment of the present invention will hereinafter be described by referring to the drawings.
(Spot Welding Structural Part)

FIG. 1 is a cross-sectional view illustrating a typical spot weld zone of the structural part according to the embodiment of the present invention.

As shown in FIG. 1, the welding structural part 1 has a structure to have a spot weld zone 3 formed by spot welding in a region where steel sheets 2, 2 are overlapped. The spot weld zone 3 includes a weld nugget 4 and a heat affected zone 5 surrounding the weld nugget 4. Contacting surfaces of the steel sheets in the heat affected zone 5 are bonded by solid-phase bonding thereby forming a solid-phase bonded zone 5A shown by the dotted line in the figure.

In the boundary region between the weld nugget 4 and the heat affected zone 5, the weld nugget 4 may bulge into the heat affected zone 5 along the overlapped region of the steel sheets as a convex portion 4A. As shown in FIG. 1, this convex portion 4A is formed within the heat affected zone 5, but is not structured to extend into the exterior region of the heat affected zone 5.

The spot weld zone 3 is formed by resistance heating to be performed to form the weld nugget 4, which will be described later.

The microstructure of the heat affected zone 5 has a fine dual-phase structure consisting of a hard phase and a soft phase, which will be described later. The hard phase of the heat affected zone 5 and the microstructure of the weld nugget 4 have martensite where fine carbide is dispersed. The microstructure can be observed by using an optical microscope or an electron microscope. The surface of the microstructure can be made flat by the electropolishing method disclosed in Patent Reference 3 and Non-patent Reference 2.
(Hardness Distribution in the Spot Weld Zone)

Figure 2:
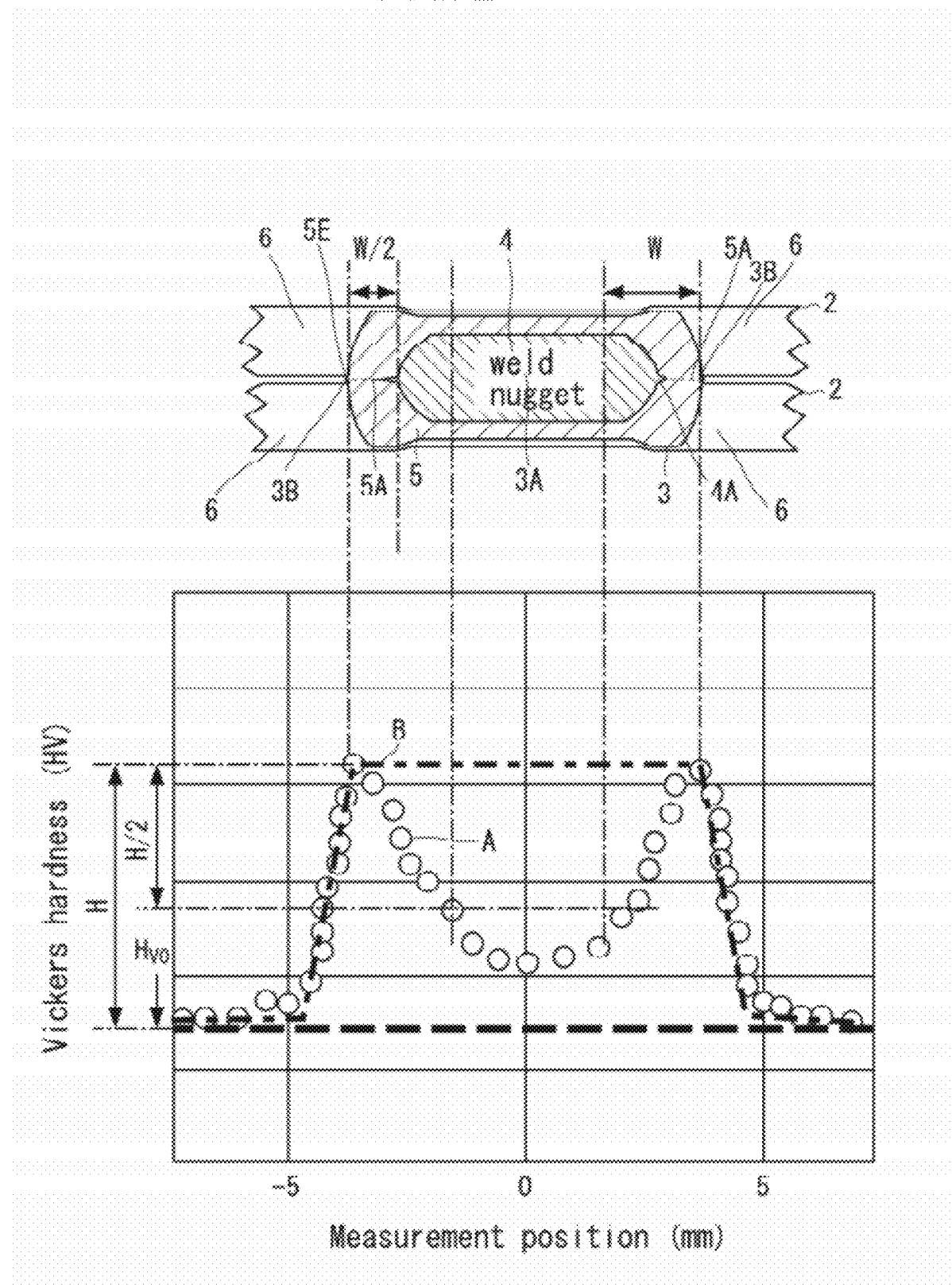
FIG. 2 illustrates a typical hardness distribution of the cross-sectional area of the spot weld zone.

FIG. 2 illustrates a typical hardness distribution on the cross-sectional area of the spot weld zone. The horizontal axis of FIG. 2 represents the position along the overlapped region of the steel sheets on the cross section of the spot weld zone, specifically the position in the direction along the overlapped surfaces of the two steel sheets 2, 2, corresponding to the cross section of the spot weld zone. The vertical axis in the figure represents Vickers hardness in the overlapped region of the steel sheets. The Vickers hardness of the steel sheets (base material) before spot welding is indicated as $HV_0$.

As shown in FIG. 2, in the hardness distribution of the spot weld zone 3, the hardness on the surface of the steel sheets 2 increases as the position shifts from the exterior region of the heat affected zone 5 toward the outer peripheral region 5E of the heat affected zone 5, and decreases as the position shifts from the heat affected zone 5 toward the center of the weld nugget 4. Furthermore, in the outward direction of the outer peripheral region 5E of the heat affected zone, the hardness is the highest at the outer peripheral region 5E, and decreases as the position shifts outward, namely toward the region not having been spot welded, reaching the Vickers hardness of the steel sheets before the spot welding ($HV_0$). Namely, the hardness ($H_V$) distribution is shown in a shape of alphabet of M. Specifically, the weld nugget 4 includes a region where the hardness is higher than the Vickers hardness ($H_{V0}$) of the steel sheets 2, 2 by H. This region where the hardness is higher is called a hard region. Meanwhile, with respect to the hard region, the region where the hardness is lower in the heat affected zone 5 and the weld nugget 4 is called a soft region. H is the hardness falling within the 0<H≤80 range, for example. Furthermore, as shown in the figure, when the maximum increment in hardness of the heat affected zone 5 with respect to the steel sheets 2 is assumed as H, the hardness of the weld nugget 4 at the center can be made to be lower than the maximum hardness of the heat affected zone 5 by ½ of H or more.

Paying attention to the center 3A of the spot weld zone 3 and the bonded edge 3B, it is found that the hardness of the spot weld zone 3 decreases as the position shifts from the bonded edge 3B toward the center 3A of the spot weld zone 3. Namely, the hardness distribution within the spot weld zone 3 exhibits U-shaped hardness ($H_V$). In this case, the center 3A of the spot weld zone 3 represents the central position in the direction along the overlapped surfaces of the two steel sheets 2, 2, namely the center position of the weld nugget 4. The bonded edge 3B of the spot weld zone 3 corresponds to the outer peripheral position 5E of the heat affected zone 5 on the overlapped surface of the two steel sheets 2, 2.

The hardness distribution shown by the dotted line in FIG. 2 is the one obtained when the spot weld zone is formed by the conventional low-frequency (50 Hz or 60 Hz) resistance heating. The hardness distribution of the spot weld zone formed by the conventional spot welding exhibits that the hardness of the weld nugget and that of the heat affected zone remain at approximately the same level, which is higher than the hardness of the base material.

The feature of the hardness distribution of the cross-sectional area of the spot weld zone 3 of the present invention is that the hardness of the weld nugget 4 and that of the exterior region 6 of the heat affected zone are approximately the same. The reason for this is assumed to be as follows: By applying high-frequency power in spot welding, the peripheral region of the weld nugget 4 is heated, forming a microstructure similar to the microstructure having been subjected to so-called tempering.

The welding structural part 1 of the present invention was subjected to a cross tensile test to examine the mode of break. The break was found to be so-called matrix break. In the cross tensile test of the welding structural part 1 conducted by applying high-frequency power as post heating, breaking force of 4 kN, namely the breaking force of conventional welding structural part using the same steel sheets 2, 2, or higher was obtained easily. If the high-frequency power in post heating is adjusted, the breaking force of the cross tensile test of the welding structural part of the present invention 1 could be made to be 8 kN or higher, which is twice as high as the breaking force of the conventional welding structural part.

As a material of the welding structural part 1 of the present invention, the steel sheet 2 containing carbon in 0.15 mass % or more can be used. Note that the fine carbide in the microstructure of the heat affected zone 5 described above is a compound of carbon, iron and metals contained other than iron.

In the microstructure including the heat affected zone 5 and the weld nugget 4 of the welding structural part 1 of the present invention, the hard region and the soft region in hardness distribution of the heat affected zone 5 and the weld nugget 4 are called a hard phase and soft phase, respectively. Such a microstructure including hard and soft phases mixed with each other, namely a microstructure where hard-phase and soft-phase portions having different degrees of hardness are mixed finely is called a fine dual-phase microstructure. The hard phase of the heat affected zone 5 and the microstructure of the weld nugget 4 have a microstructure of martensite where fine carbides are dispersed. The carbide is characterized as follows: it is not precipitated on the pre-austenite grain boundary in a form of a film, but finely dispersed over the entire region of the microstructure including the pre-austenite grain boundary. In other words, in the microstructure of the welding structural part 1 of the present invention, carbide is finely dispersed over the area including the pre-austenite grain boundary, which is a major feature of the present invention not obtainable by conventional techniques. Conventionally, the precipitation of carbide on the pre-austenite grain boundary in a form of a film cannot be suppressed.

The state of dispersion of carbide of the welding structural part 1 wherein carbides are finely dispersed in martensite will be described below.

Assuming the particle diameter of the carbides dispersed in the the weld nugget 4 and soft region of the heat affected zone 5 as d, and the mean spacing of particles (distance between particles) as L, the dispersion coefficient of carbide particles is defined by equation (1) shown below.

$$\text{Dispersion coefficient of particles} = (\text{Square root of particle diameter})/\text{Mean spacing of particles} = (d)^{1/2}/L \quad (1)$$

The dispersion coefficient of particles is proportional to the strain hardening rate according to Ashby's strain hardening theory.

Figure 3:
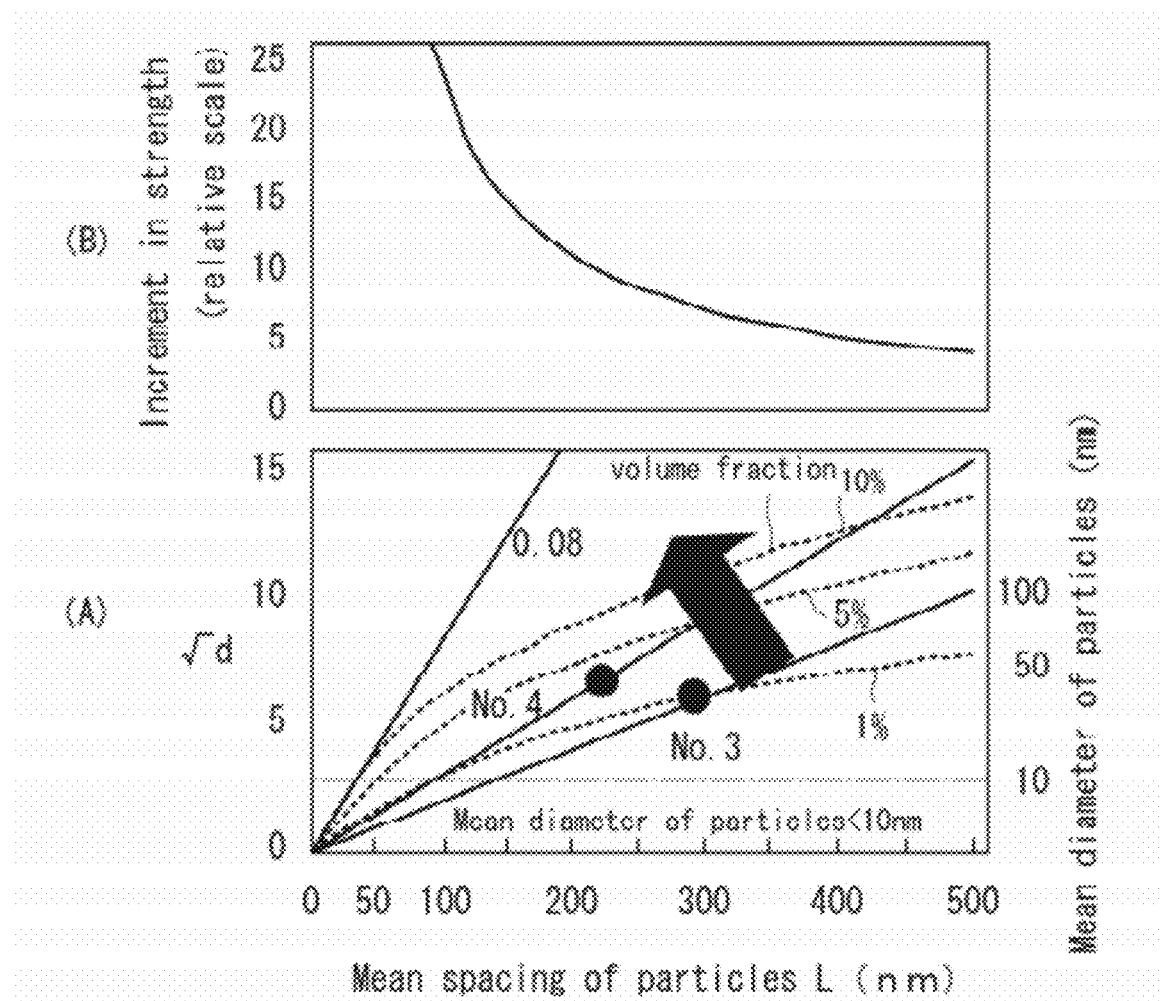
FIG. 3(A) is a chart presenting a formula (1), and (B) illustrates the relation between increment in strength and mean spacing of particles L.

FIG. 3(A) is a chart presenting a formula (1), and (B) illustrates the relation between increment in strength and mean spacing of particles L. The horizontal axis in FIG. 3(A) and FIG. 3(B) represents mean spacing of particles L (nm), and the vertical axis of FIG. 3(A) represents $(d)^{1/2}$. The vertical axis of FIG. 3(B) represents the increment in strength (relative unit).

In FIG. 3(A), the formula (1) is expressed by slopes from the origin of coordinates. The strain hardening rate is proportional to the gradient of each slope. Consequently, if carbide particles are dispersed, allowing the dispersion coefficient of particles to increase, namely allowing the dispersion coefficient of particles to increase, higher ductility can be obtained. It is desirable that the particle volume fraction shown by the dotted lines is 1% or higher but not exceed 10%. If the particle diameter is less than 10 nm, the effect of increasing the stress of the welding structural part 1 cannot be obtained. The particle diameter should therefore be 10 nm or larger to increase the stress.

As shown in FIG. 3(B), the increment in strength due to particle dispersion depends only on mean spacing of particles, and the smaller the mean spacing of particles, the larger the increment in strength. Consequently, the dispersion coefficient of particles described above needs to be 0.02 or higher.

(Method of Measuring the Dispersion Coefficient of Particles)

Figure 4:
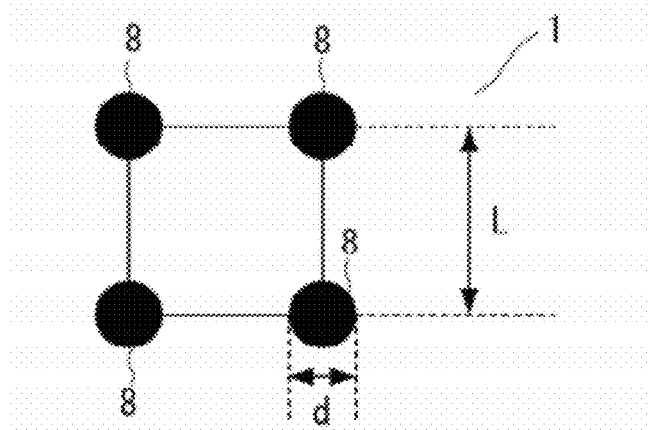
FIG. 4 illustrates the state of dispersion of carbide.

The dispersion coefficient of particles can be measured following the procedure shown below:

(a) Observe the microstructure of the spot weld zone 3 of a welding structural part by using an electron microscope of 20,000 times power, for example. FIG. 4 illustrates the state of dispersion of carbide. As shown by the figure, carbide 8 is dispersed within the spot weld zone 3. Find the particle diameter d and mean spacing of particles L of dispersed carbide 8 by the linear intercept method as in FIG. 4. In this case observation should be conducted, excluding carbide particles having particle diameter d of less than 10 nm (d<10 nm). The microstructure of the spot weld zone 3 for the electron microscope observation can be flattened by the electropolishing method disclosed in Patent Reference 3 and Non-patent Reference 1.

(b) Find the mean diameter of carbide particles d and the mean spacing L of carbide particles 8 per each field of view. The average value for each of the plurality field of view exhibiting so-called Bi-modal distribution should be excluded.

(c) Calculate the coefficient of particle distribution by finding the average value of at least three fields of view.

The mean diameter of particles d and the mean spacing of particles L found by formula (1) and the above measurement method are effective only to find the dispersion coefficient of particles that is to be used as an indicator for ensuring high ductility.

The welding equipment for conducting spot welding to manufacture welding structural part 1 of the present invention and the method of spot welding will hereinafter be described.

(Welding Equipment)

Figure 5:
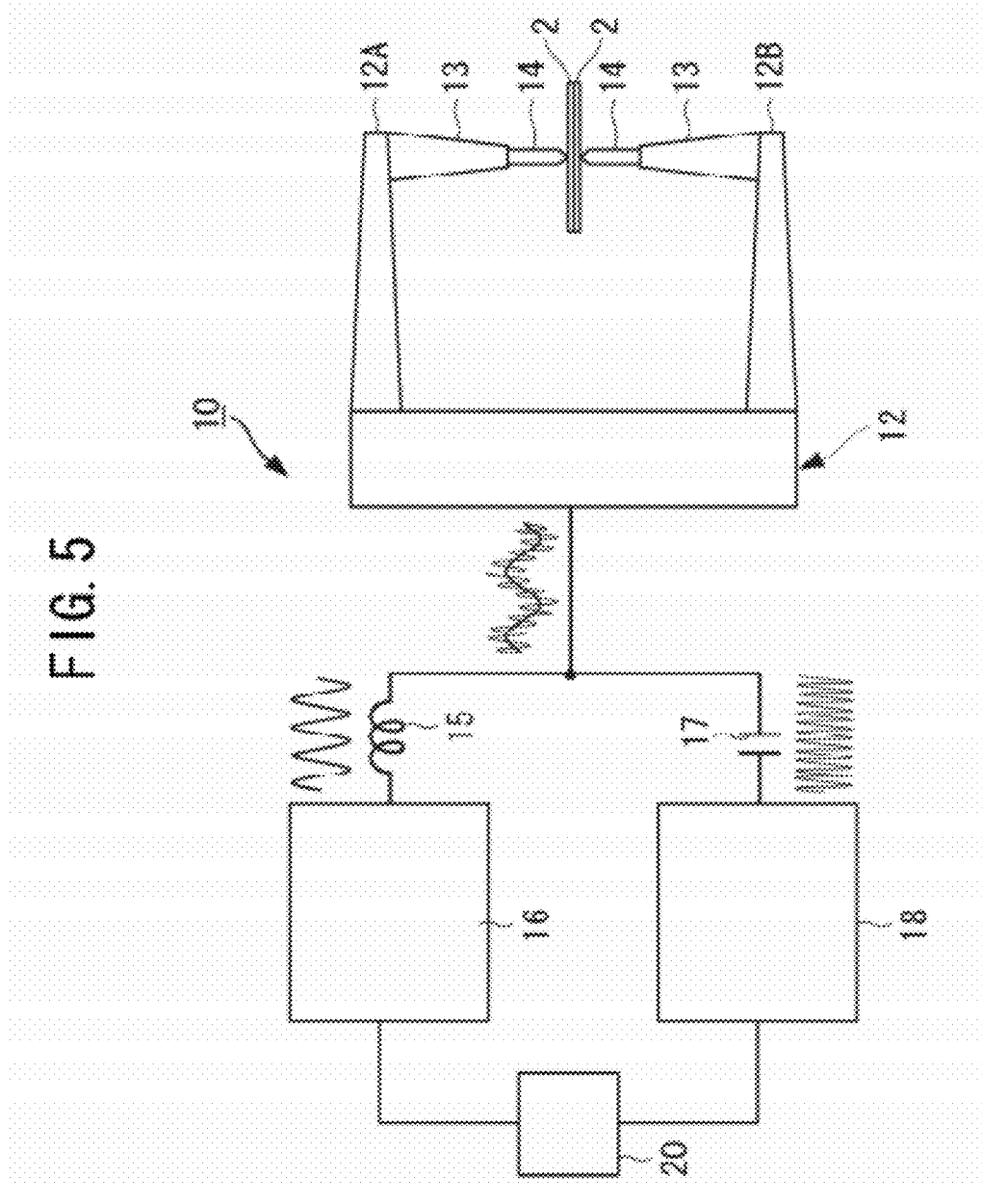
FIG. 5 illustrates a typical structure of welding equipment for spot-welding a structural part according to the embodiment of the present invention.

FIG. 5 illustrates a typical structure of welding equipment 10 for spot-welding a welding structural part according to the embodiment of the present invention.

As shown in FIG. 5, the welding equipment 10 includes an electrode arm 12, electrode supports 13 one end of which is respectively connected to the upper portion 12A and the lower portion 12B of the electrode arm 12, a pair of electrodes 14 connected to each of the other end of the electrode supports 13, a welding power supply 16 connected to the electrode arm 12 via an inductance 15, a high-frequency power supply 18 connected to the electrode arm 12 via a capacitor 17, and a power control unit 20 for controlling each output of the welding power supply 16 and the high-frequency power supply 18.

The welding equipment 10 for metallic materials further includes a fixing base for supporting the electrode arm 12, a driving mechanism for driving the electrode arm 12, a pressing mechanism for pushing out one of the electrodes 14 from the electrode supports 13, etc., none of which are shown. The pressing mechanism is used to pressurize the steel sheets 2, 2 used as a structural member to be welded described later using the electrodes 14, 14.

The electrode arm 12 is equipped with the upper arm 12A and the lower arm 12B, which are connected to the respective electrodes 14, 14 via each electrode support 13. The electrode arm 12 is also called a gun arm. Since the gun arm 12 shown is a so-called a C-shaped structure, it is also called a C-shaped gun arm. X-shaped guns etc. are also used in addition to the C-shaped gun arm 12 for portable or robot-type welding equipment. Electrode arms 12 of any shapes are applicable, but the following description assumes the welding to be performed using the C-shaped gun arm 12.

Each one of the pair of electrodes 14, 14 faces opposite to each other via a gap, into which two steel sheets 2, 2 are inserted. The electrodes 14 are made of copper, for example, and in a circular, ellipsoidal, or rod shape.

Figure 6:
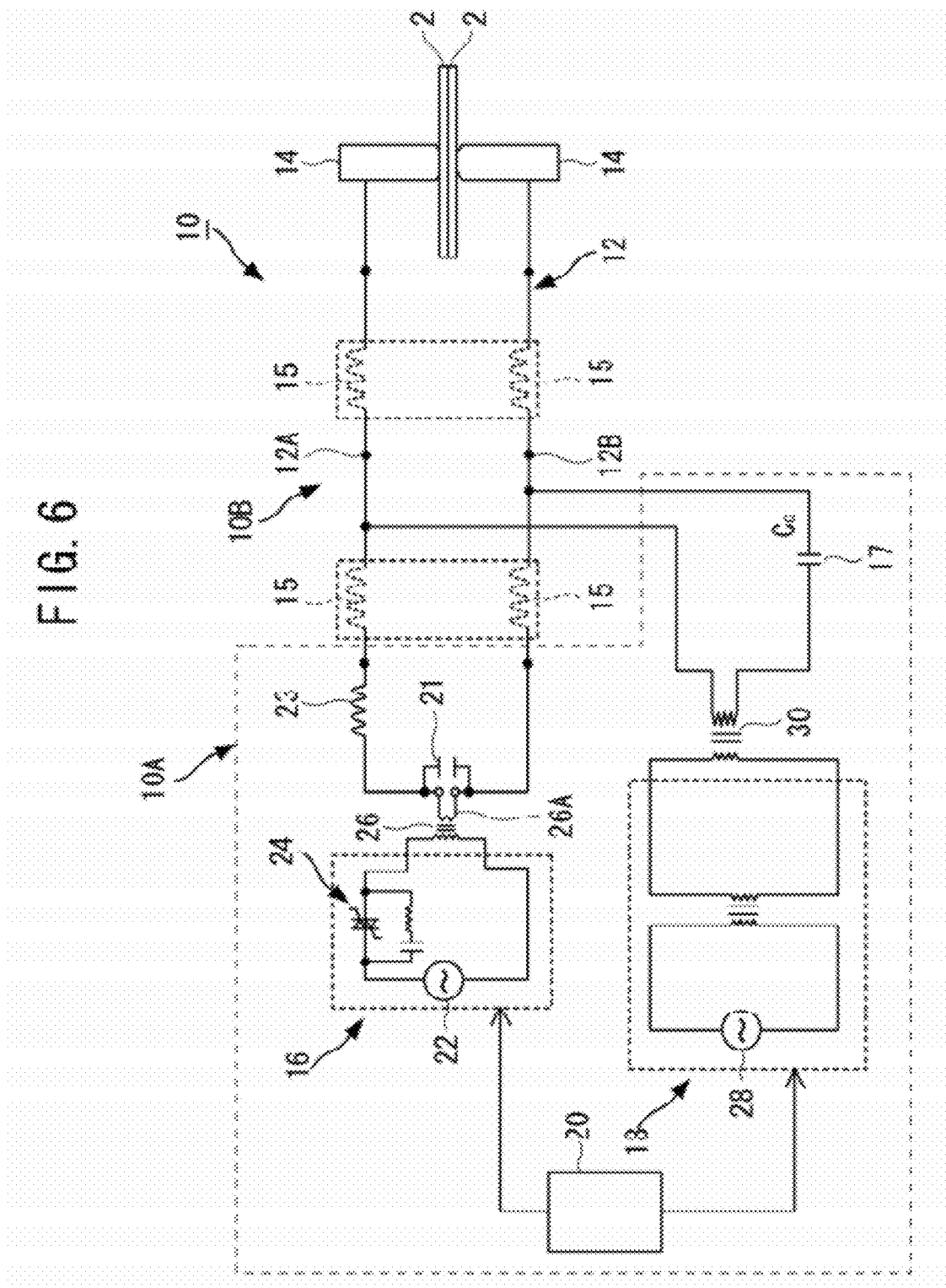
FIG. 6 is an electric circuit diagram of the welding equipment as shown in FIG. 5.

FIG. 6 is an electric circuit diagram of the welding equipment 10 as shown in FIG. 5. As shown in FIG. 6, the electric circuit of the welding equipment 10 includes a welding circuit 10A enclosed by a dotted line and a welding unit 10B. The welding circuit 10A includes electric circuits of the welding power supply 16, the high-frequency power supply 18, the inductance 15, the capacitor 17, and the power control unit 20 for controlling each output of the welding power supply 16 and the high-frequency power supply 18. The welding unit 10B constituting a circuit electrically connected to the welding circuit 10A includes a gun arm 12, a pair of electrodes 14, 14 electrically connected to the gun arm 12, and steel sheets 2, 2 sandwiched between the pair of electrodes 14, 14.

The welding power supply 16 is a low-frequency power supply including: a commercial power supply 22 having an output frequency of 50 Hz or 60 Hz for example; a low-frequency power control unit 24 connected to one end of the commercial power supply 22; and a welding transformer 26 connected to the other end of the commercial power supply 22 and the output terminal of the low-frequency power control unit 24. The both end of the secondary winding of the welding transformer 26 are connected to the left end of the upper arm 12A and the left end of the lower arm 12B of the C-shaped gun arm 12, respectively. The low-frequency power control unit 24, which includes semiconductor devices for power control such as thyristors and gate drive circuits, controls the applying power from the commercial power supply 22 to the electrodes 14.

A bypass capacitor 21 is connected in parallel to the side of the C-shaped gun arm 12 of the welding transformer 26, namely to the secondary winding 16A. The bypass capacitor 21 has a low capacitive impedance for the frequency of the high-frequency power supply 18. Consequently, the high-frequency voltage from the high-frequency power supply 18 to be applied to the secondary winding 26A can be minimized, thereby lowering the induction of the high-frequency voltage to the primary side of the welding transformer 26.

The high-frequency power supply 18 includes an oscillator 28 and a matching transformer 30 connected to the output terminal of the oscillator 28. One end of the matching transformer 30 is connected to the upper arm 12A of the C-shaped gun arm 12. The other end of the matching transformer 30 is connected to the lower arm 12B of the C-shaped gun arm 12 via a capacitor 17. This capacitor 17 can also serve as a matching capacitor in a series resonant circuit to be described later. The capacitance value of the capacitor 17 depends on the oscillating frequency of the oscillator 28 and the stray inductance 15 of the C-shaped gun arm 12. The oscillator 28 includes an inverter using various transistors, and controls the power supplied from the high-frequency power supply 18 to the electrodes 14.

As shown in FIG. 6, the path from the C-shaped gun arm 12 connected to the secondary winding of the welding transformer 26 to the electrodes 14, 14 includes the inductance 15. As the inductance 15, the stray inductance formed in the C-shaped gun arm 12 can be used. If the capacitor 17 also serves as the matching capacitor, a series resonant circuit including this matching capacitor 17 and inductance 15 may be configured.

(Current Distribution Generated on Steel Sheets)

Figure 7:
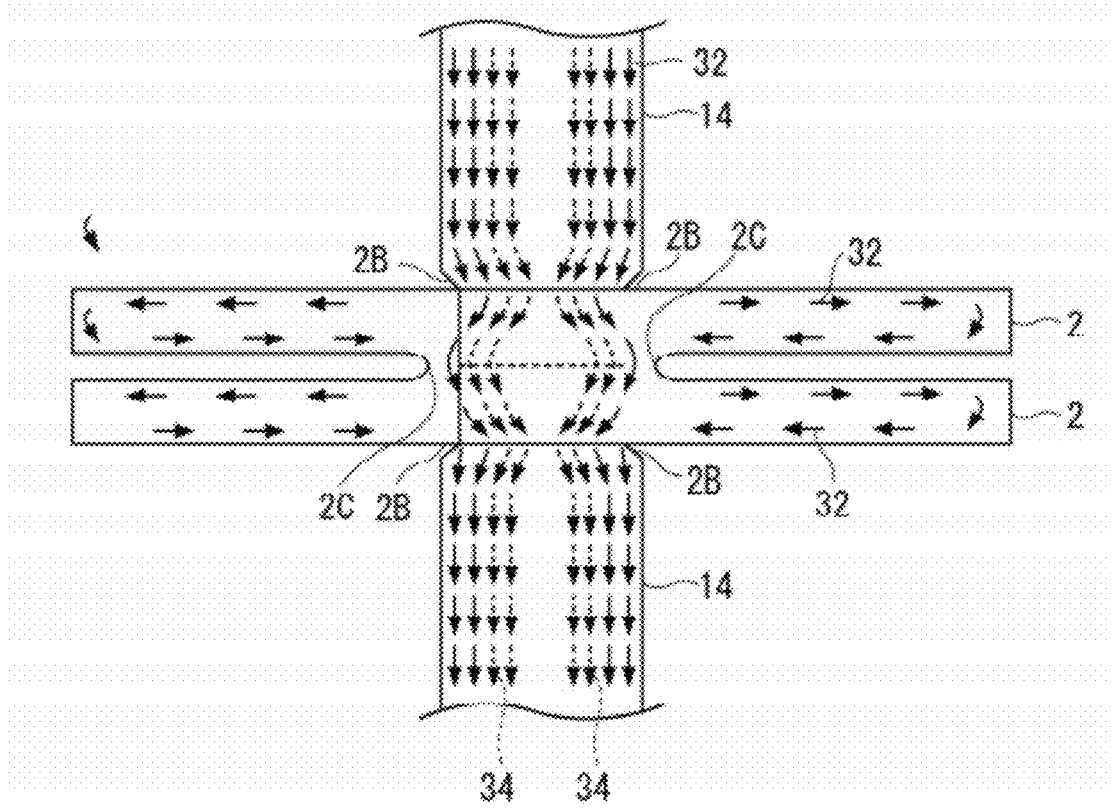
FIG. 7 is a cross-sectional view illustrating current distribution on the steel sheets when a electric power is simultaneously applied from a low-frequency power supply and a high-frequency power supply to two steel sheets overlapped with each other.
Figure 8:
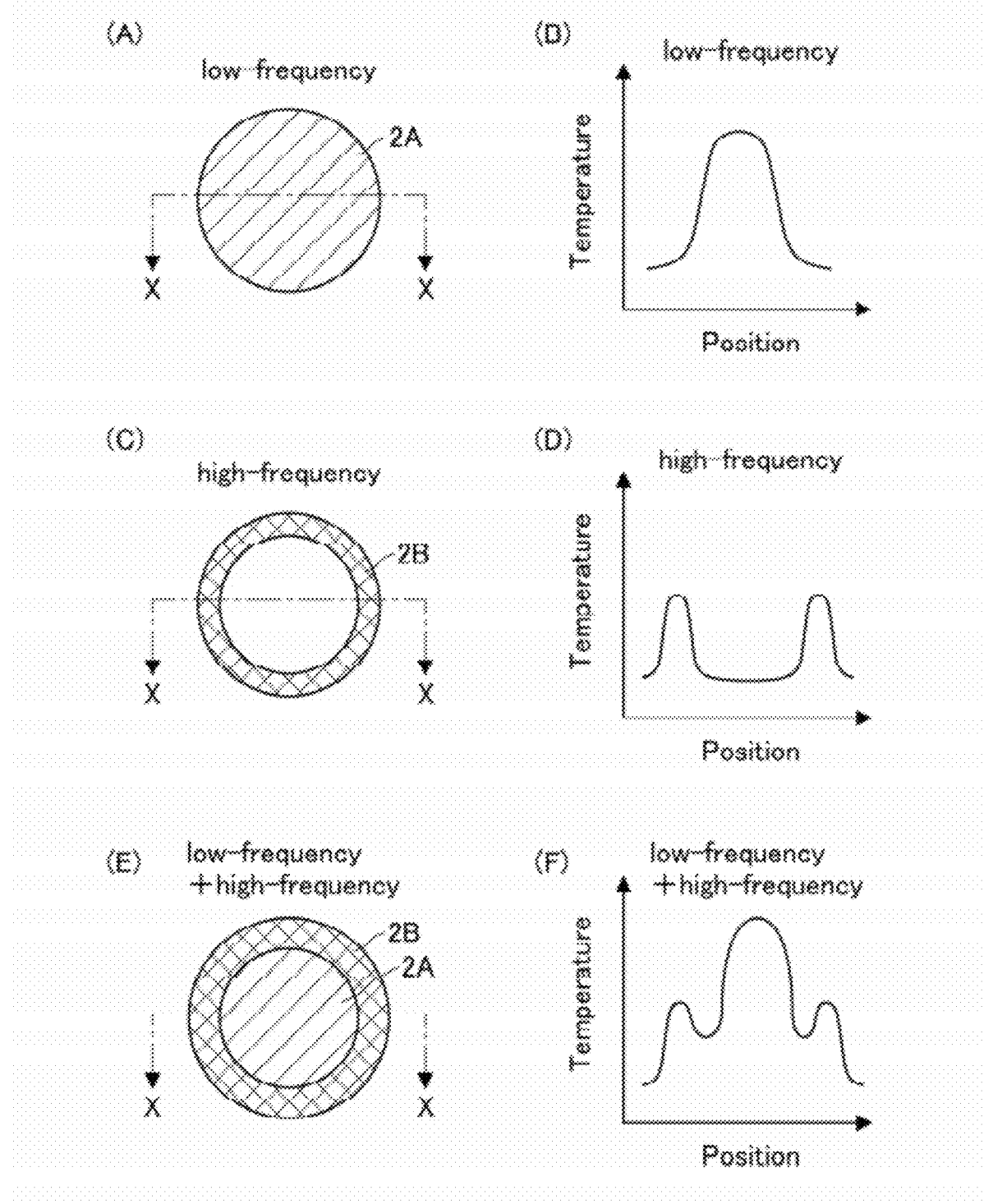
FIG. 8 illustrates the heated state of the steel sheets.
Figure 9:
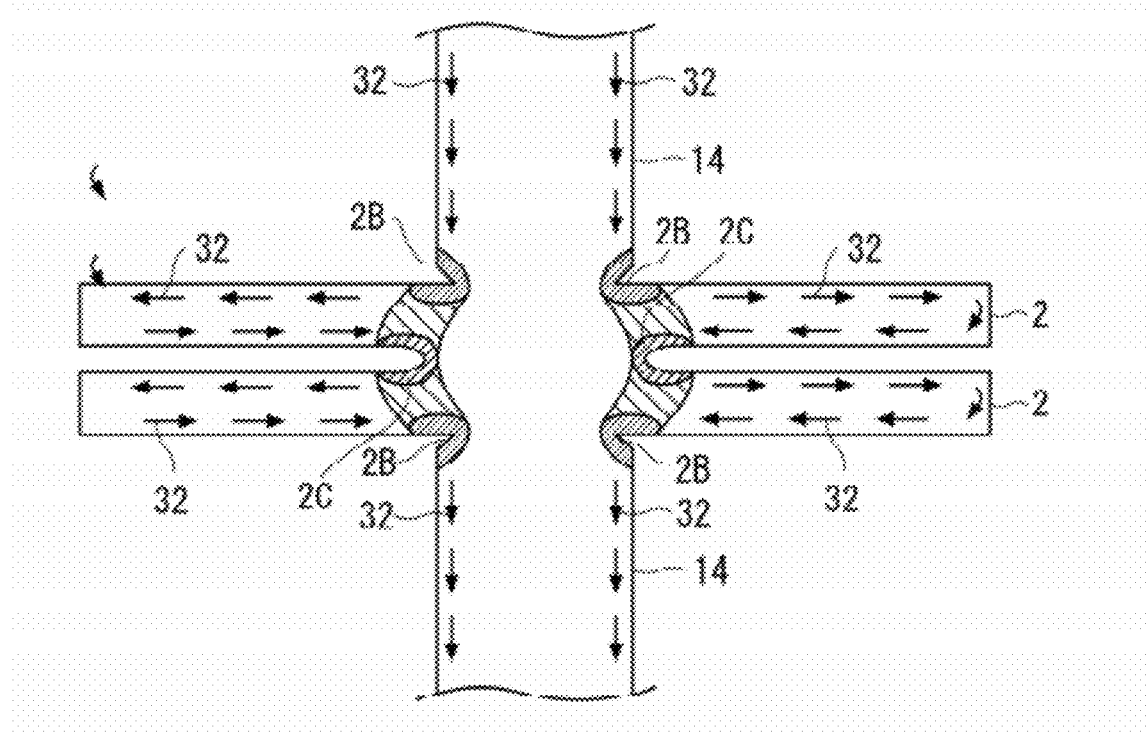
FIG. 9 is a cross-sectional view illustrating the heated state of the steel sheets by high-frequency current.

FIG. 7 is a cross-sectional view illustrating current distribution generated on the steel sheets 2,2 when the electric power is simultaneously applied from the low-frequency power supply 16 and the high-frequency power supply 18 to two steel sheets 2 overlapped with each other. FIG. 8 illustrates plan views of the heated state of the steel sheets 2, and FIG. 9 is a cross-sectional view illustrating the heated state of the steel sheets 2 by the high-frequency current 32.

In FIG. 7, a solid line represents high-frequency current 32 from the high-frequency power supply 18, and a dotted line represents low-frequency current 34 from the low-frequency power supply 6. The electrodes 14 are made of copper, the diameter of the tip of the electrodes 14 is 6 mm, and the frequency of the low-frequency power supply 16 is 50 Hz. The thickness of a steel sheet 2 is 2 mm, and the frequency of the high-frequency power supply 18 is 30 kHz.

As shown in FIG. 7, the low-frequency current 34 is applied within the entire electrodes 14, 14, and thus the steel sheets 2 are energized in a width mostly equivalent to the cross-sectional area of the nugget.

FIG. 8(A) is a plan view of the region of the steel sheets 2 heated only by the low-frequency current 34, the major heated region being inside the circle 2A, which is a projection of the axial plane of the electrodes 14. FIG. 8(B) shows the temperature distribution along the line X-X in FIG. 8(A), exhibiting that the inside of the circle 2A, namely a projection of the axial plane of the electrodes 14 on the steel sheets 2, is heated intensively.

Meanwhile, the applying high-frequency current 32 is concentrating on the surface and the outer peripheral region of the electrodes 14. The difference in distribution between the low-frequency current 34 and the high-frequency current 32 is related to so-called skin depth.

FIG. 8(C) is a plan view of the region of the steel sheets 2 heated by high-frequency current 32 only, the major heated region being the outer circle, which is the projection of the axial plane of the electrodes 14 on the steel sheets 2, and the proximity of the outer circle, namely ring-shaped region 2B forming the outer periphery of the circle. FIG. 8(D) shows the temperature distribution along the line X-X in FIG. 8(C). In the steel sheets 2, the outer circle, namely the projection of the axial plane of the electrodes 14 on the steel sheets 2, and the ring-shaped region 2B of the outer circle are heated by resistant heating.

High-frequency current 32 also flows on the surface of the steel sheets 2 not directly contacting the electrodes 14 (the surface area extending outward from the area of the steel sheets 2 contacting the electrodes in FIG. 7), which will be described later. The area of the steel sheets 2 subjected to induction heating by the high-frequency current 32 applied in the area adjacent to the region directly contacting the electrodes is also heated. In other words, the outer circle projected on the steel sheets 2 and the ring-shaped region 2B are heated by resistance heating by high-frequency current 32 (FIG. 8(C)), and at the same time, the region adjacent to the area of the steel sheets 2 contacting the electrodes is also subjected to high-frequency induction heating by high-frequency current 32, which will be described by referring to FIG. 9.

Figure 22:
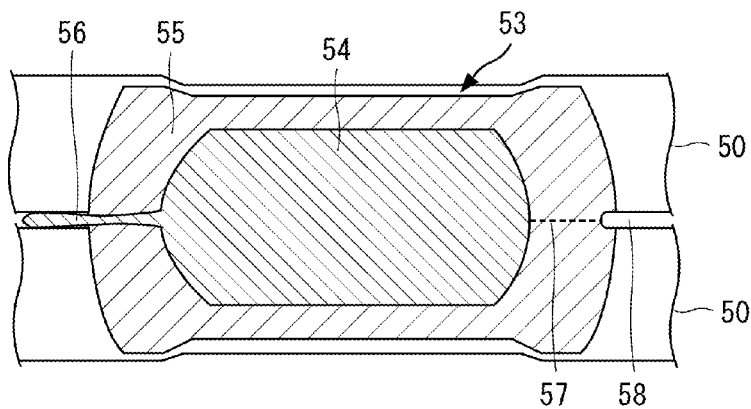
FIG. 22 is a detailed cross-sectional view of a weld zone formed by conventional spot welding.
Figure 23:
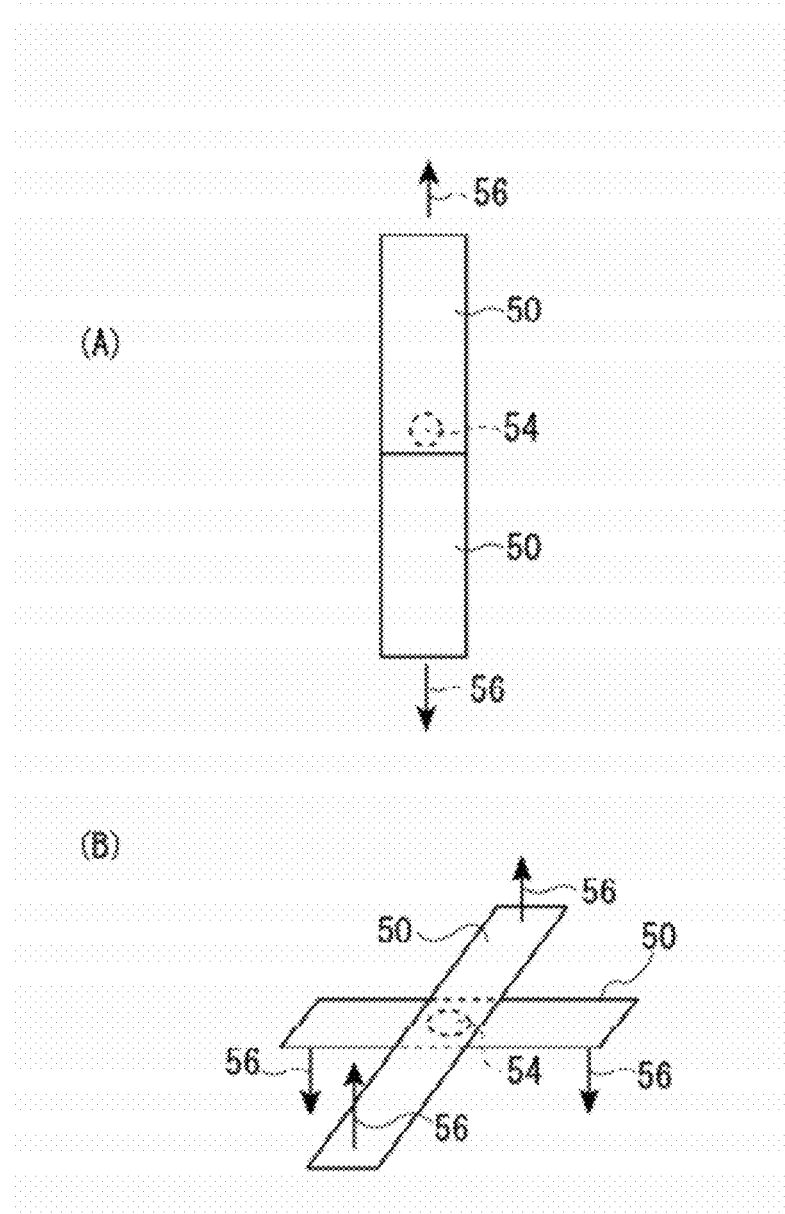
FIG. 23 is a plan view of samples used for a tensile test to examine the spot weld strength of high-tensile steel sheets, where (A) is a lap joint sample, and (B) is a cross joint sample.
Figure 24:
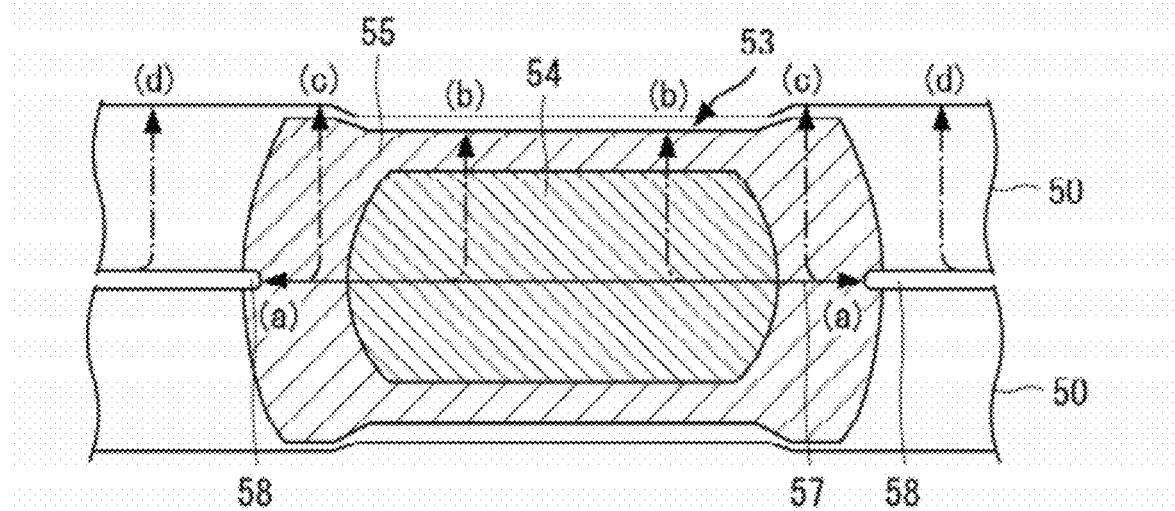
FIG. 24 illustrates the mode of break of the cross tensile test of the spot weld zone.

As shown in the cross-sectional view in FIG. 9, the ring-shaped region 2B and the edge portion 2C of the bonded surface of the steel sheets 2 are heated by high-frequency current 32. The edge portion 2C on the bonded surface of the steel sheets 2 is equivalent to the bonded edge 3B of the bonded surface 5A in the heat affected zone 5 in the spot weld zone 3 as shown in FIG. 2. This edge portion 2C is also in a shape of a ring similar to the ring-shaped region 2B formed on the surface of the steel sheets 2. The high-frequency current 32 flows intensively in the two ring-shaped regions 2B and the edge portions 2C on the bonded surface of the steel sheets 2. Consequently, the ring-shaped region 2B at two positions and the edge portion 2C of the bonded surface of the steel sheets 2, three positions in all, are the regions where the temperature increases to the highest due to high-frequency current 32. If the edge portion 2C on the bonded surface of the steel sheets 2 is heated by high-frequency current 32, the strong solid-phase bonding 5A is formed on the boundary of the steel sheets 2 in the heat affected zone 5. This strong solid-phase bonding 5A is not the corona bond region formed conventionally (see the region marked with code 57 in FIG. 22).

Consequently, when the power is simultaneously applied to the two steel sheets 2 overlapped with each other from the low-frequency power supply 16 and the high-frequency power supply 18, the heated regions of the steel sheets 2 are superimposed by the inside of the circle 2A where the low-frequency current 34 is applied and by the ring-shaped region 2B where the high-frequency current 32 is applied as shown in FIG. 8 (E). Furthermore, the temperature distribution on the steel sheets 2 generated by these currents 32, 34 is shown in FIG. 8(F). The temperature distribution is superimposed by the temperature distribution due to the low-frequency current 34 as shown in FIG. 8(B) and by the temperature distribution due to the high-frequency current 32 as shown in FIG. 8(D). In other words, in the steel sheets 2: the inside of the circle 2A formed by projecting the axial plane of the electrodes 14 on the steel sheets 2; the ring-shaped regions 2B in proximity to the outer circle formed by projecting the axial plane of the electrodes 14 on the steel sheets 2; and the edge portion 2C on the bonded surface of the steel sheets 2 as shown in FIG. 9 are heated.

Current distribution generated on two steel sheets 2 overlapped with each other was described above. Current distribution generated when three or more steel sheets 2 are placed together will be described below.

Figure 10:
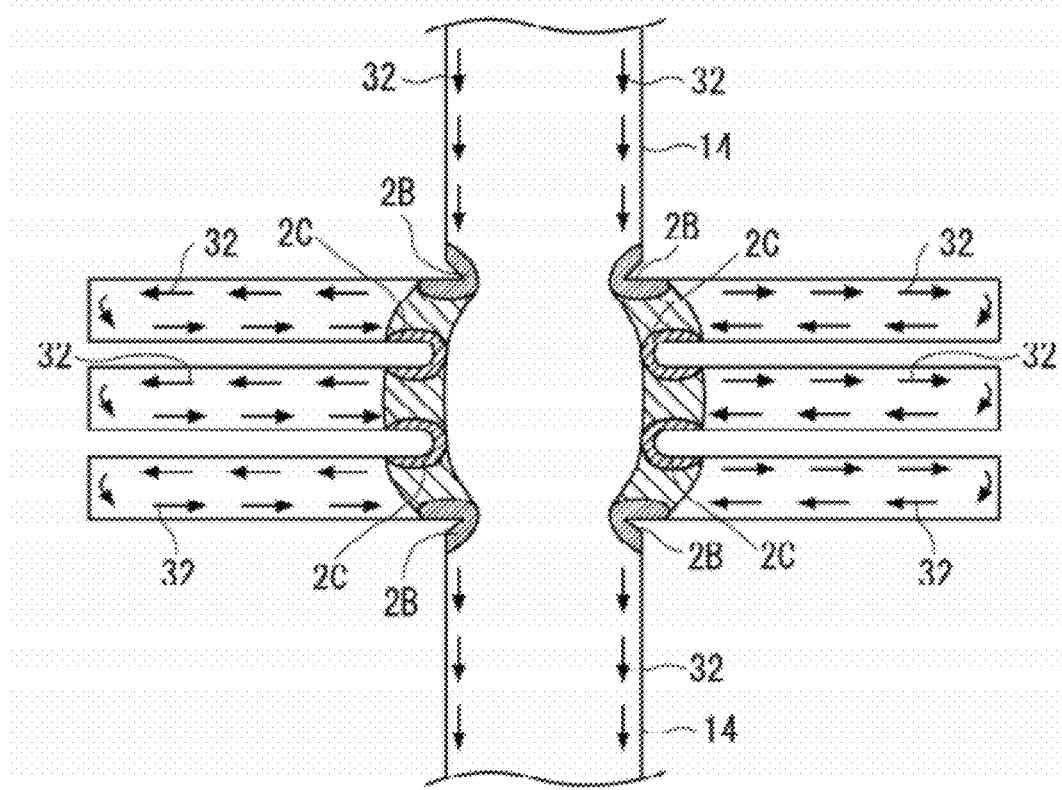
FIG. 10 is a cross-sectional view illustrating the heated state of three steel sheets overlapped with one another by high-frequency current.

FIG. 10 is a cross-sectional view illustrating the status of three steel sheets 2 overlapped with one another heated by the high-frequency current 32. As shown in FIG. 10, when three steel sheets 2 are overlapped, two ring-shaped regions 2B and two edge portions 2C on the bonded surfaces of the steel sheets 2, that is four ring-shaped regions in all are heated by the high-frequency current 32.

(Skin Depth)

The skin depth of the steel sheets 2 is an approximate depth down to which current penetrates when the low-frequency or the high-frequency power is applied to the steel sheets 2.

The skin depth of the steel sheets 2 changes with negative one half, i.e., $-\frac{1}{2}$, power of the frequency. Consequently, when the heated material is the same, the lower the frequency, the thicker the skin depth of the steel sheets 2, and the higher the frequency, the thinner the skin depth. The power for spot welding has the frequency of 50 Hz or 60 Hz in general. When the diameter of the tip of the electrodes 14 is approximately 6 mm, the current is flown over the entire electrodes 14.

Meanwhile, when only the surface of the steel sheets 2 is to be heated, by adjusting the frequency of the high-frequency power supply 18, the skin depth can be set to a desired depth from the surface. Therefore, the setting the frequency of the high-frequency power supply 18 appropriately is sufficient to select the heating width of the outer peripheral region to be heated by the high-frequency power supply 18. In other words, by changing the frequency of the high-frequency current 22, the heating width of the outer peripheral region can be changed, and by subjecting the ring-shaped regions 2B to heat treatment such as tempering, the ring-shaped regions 2B can be softened.

When the depth of the steel sheets 2 from the surface becomes equal to the skin depth of the high-frequency current 32 to be applied within the steel sheets 2, the magnitude of the high-frequency current is expressed as 1/e (e is a natural logarithm), namely approximately ⅓, of the high-frequency current applied on the outmost surface of the steel sheets 2. The skin depth of the steel sheets is approximately 9.3 mm when the frequency is 50 Hz, and approximately 0.3 mm when the frequency is 40 kHz.

(Spot Welding Method)

Spot welding using the welding equipment 10 and heat treatment will hereinafter be described.

The steel sheets 2, 2 are welded by sandwiching them with a pair of electrodes 14, 14, and by heating the steel sheets 2, 2 by applying current as shown in FIG. 5. For example, the welding process may include: a first step of heating a given region of the steel sheets 2, 2 by a first applying current to the pair of electrodes 14, 14; and a second step of heating a region different from the first region by a second applying current to the pair of electrodes 14, 14, with the pair of electrodes 14, 14 sandwiching the steel sheets 2, 2 maintained at the same position as the first step. When the first applying current is performed from the low-frequency power supply 16, the given heated region of the steel sheets 2, 2 by the first applying current is inside the circle 2A described above. When the second applying current is performed from the high-frequency power supply 18, the given heated region of the steel sheets 2 by the first applying current is the ring-shaped region 2B described above. The first step and the second step described above may be combined.

Figure 11:
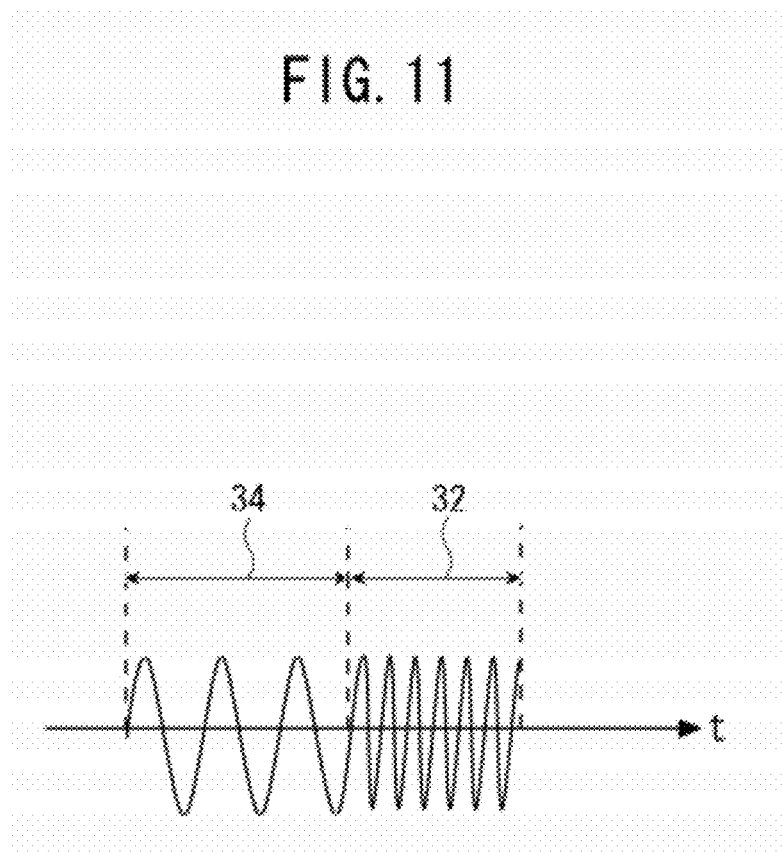
FIG. 11 is a chart showing a heating waveform obtained when power is applied from a low-frequency power supply and then from a high-frequency power supply.

FIG. 11 is a chart showing a heating waveform obtained when the power is applied from the low-frequency power supply 16 and then from the high-frequency power supply 18. The horizontal axis of FIG. 11 represents time (arbitrary units), and the vertical axis represents waveform 34, 32 (arbitrary units) of the current applied from the low-frequency power supply 16 and the high-frequency power supply 18.

As shown in FIG. 11, the power was applied from the low-frequency power supply 16 first, the power supply was stopped, and the power was then supplied from the high-frequency power supply 18. In this case, the steel sheets 2 were spot-welded first by application of the power from the low-frequency power supply 16. The power having the second frequency, which is higher than the first frequency, was then applied from the high-frequency power supply 18. By the power applied from the high-frequency power supply 18, the surface, not contacting the electrodes 14, of the outer peripheral region of the weld nugget 4 of the two steel sheets 2 is heated. As for the spot weld zone as shown in FIG. 2, the second frequency power, which is higher than the first frequency and applied to the electrodes 14, heated the outer peripheral region of the weld zone or outside region sandwiched by a pair of electrodes 14, 14 of the two steel sheets 2, 2. And at the same time, the second frequency power heated the bond edge portion 3B of the weld zone of the overlapped surfaces of the two steel sheets 2, 2.

According to the welding equipment 10 of the present invention, by applying power from the high-frequency power supply 18 after the power is applied from the low-frequency power supply 16, the outer peripheral region of the wend nugget 4 formed by spot welding can be heated.

In the example described above, the targets of spot welding were steel sheets 2, 2 but the shape of the targets could be in any shape other than plates. The example exhibited the spot welding of two steel sheets 2, but three or more plates can be welded.

EXAMPLE 1

Specific examples where steel sheets 2 are spot welded by the welding equipment 10 will hereinafter be described in detail.

Two steel sheets 2 were spot-welded. The conditions including the steel sheets 2, the low-frequency power supply 16, and the high-frequency power supply 18 used are shown below.

Steel sheets 2: Thickness; 1.2 mm, Size; 5 cm×15 cm
Low-frequency power supply 16: 50 Hz; Electrodes 14 made of copper has tip diameter of 6 mm and; Power capacity of 50 kVA
Energization time of low-frequency power supply 16: 0.3 to 0.5 sec
High-frequency power supply 18: 30 kHz; 50 kW output
Energization time of high-frequency power supply 18: 0.3 to 0.6 sec Composition of the steel sheets 2 includes C (carbon) in 0.19 to 0.29 mass % other than iron.

Figure 12:
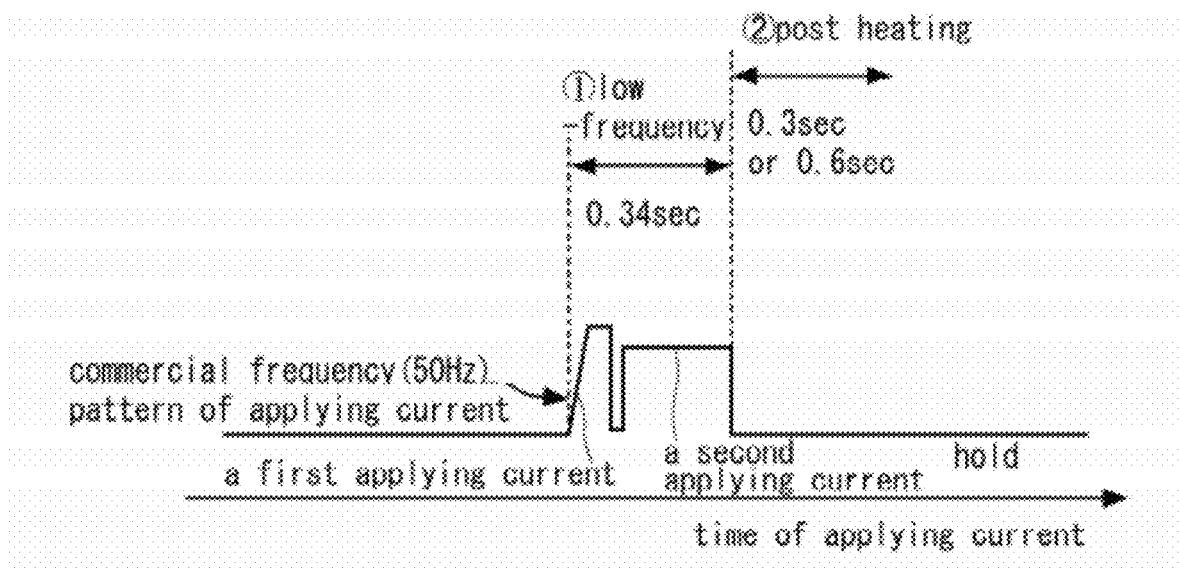
FIG. 12 is a chart illustrating the application of the power from the low-frequency power supply and the high-frequency power supply in Example 1.

FIG. 12 is a chart illustrating the application of the power from the low-frequency power supply 16 and high-frequency power supply 18 in Example 1.

At first, the welding was performed by applying power from the low-frequency power supply 16. As shown in FIG. 12, the power from the low-frequency power supply 16 was applied in two steps, as a first energization and a second energization. The rise time of a first current by the first energization was regarded as one cycle, and the first energization including the duration when the maximum value of the first current was maintained was regarded as two cycles. The maximum value of the first current was approximately 9 kA. After the first energization, cooling was conducted for one cycle, and then the second energization was performed. Energization was conducted for 14 cycles with the maximum value of the second current by the second energization set to be 7.5 kA. The energization in the second stage by the low-frequency power supply 16 was performed for 17 cycles including cooling, etc. Since one cycle was 0.02 sec, the welding time was 0.34 sec. After the second energization from the low-frequency power supply 16 was completed, the power from the high-frequency power supply 18 was immediately applied for 0.3 sec. or 0.6 sec. The applied high-frequency power was 6 kW.

EXAMPLE 2

In Example 2, the high-frequency power of 16 kW was applied for 0.3 sec. or 0.6 sec. The power from the low-frequency power supply 6 was applied in the same manner as Example 1.

EXAMPLE 3

In Example 3, the high-frequency power of 27 kW was applied for 0.3 sec. or 0.6 sec. The power from the low-frequency power supply 6 was applied in the same manner as Example 1.

COMPARATIVE EXAMPLE

As a comparative example to Examples 1 to 3, the welding was performed by applying low-frequency power supply 6 only without applying high-frequency power supply 8. In other words, the conventional spot welding was performed.

The welded samples in the Examples and Comparative Example were subjected to a cross tensile test to find their breaking forces.

Figure 13:
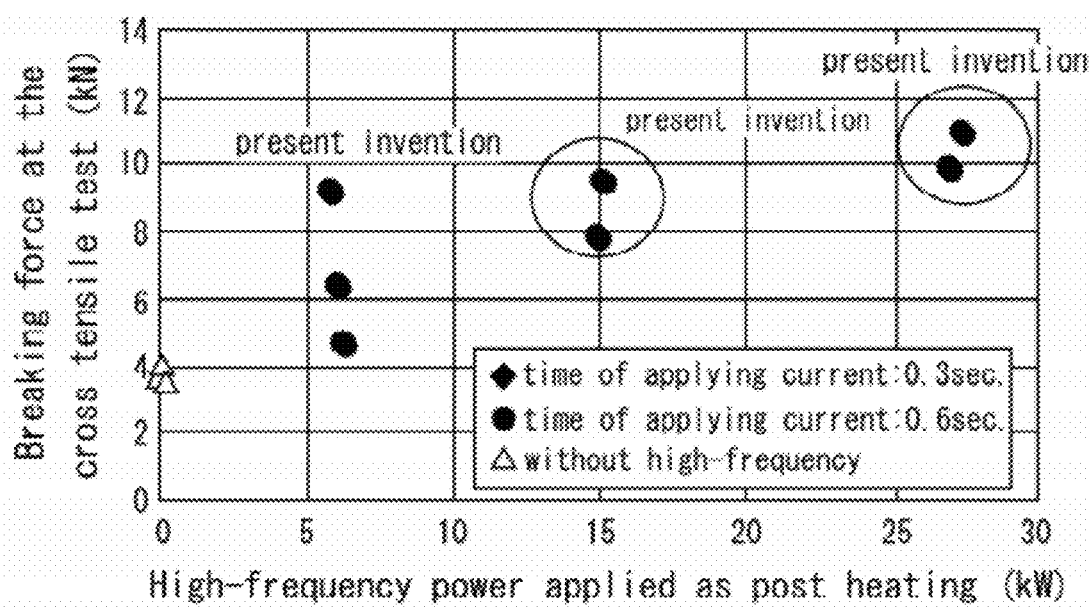
FIG. 13 is a chart showing the high-frequency power applied in post heating of the structural part and the breaking force in a cross tensile test in the Example and Comparative Example.

FIG. 13 is a chart showing the high-frequency power applied as post heating and the breaking forces of welding structural part 1 in the Examples and Comparative Example obtained by the cross tensile test. The horizontal axis in FIG. 13 represents applied high-frequency power (kW), and the vertical axis represents breaking force (kN). The number of welding structural part samples used for application of high-frequency power of 6 kW in Example 1 was three each for energization time of 0.3 sec. and 0.6 sec.

As shown in FIG. 13, the breaking force was found to be approximately the same with the energization time of 0.3 sec. and 0.6 sec., with the breaking force being approximately 4.5 kN, 6.3 kN, and 9.3 kN. Matrix breaks were occurred in all of the welding structural parts s 1.

The number of welding samples used for application of high-frequency power of 16 kW in Example 2 was three each for energization time of 0.3 sec. and 0.6 sec.

As shown in FIG. 13, the breaking force was found to be approximately the same with the energization time of 0.3 sec. and 0.6 sec., with the breaking force being approximately 8 kN, 9.5 kN, and 9.5 kN. Matrix breaks were occurred in all of the welding structural part 1.

The number of welding samples used for application of high-frequency power of 27 kW in Example 3 was two each for energization time of 0.3 sec. and 0.6 sec.

As shown in FIG. 13, the breaking force was found to be approximately the same with the energization time of 0.3 sec. and 0.6 sec., with the breaking force being approximately 10 kN and 11 N. Matrix breaks were occurred in all of the welding structural parts 1.

The sample number of welding structural part in Comparative Example was three, and the breaking force fell within a range approximately from 3.5 to 4 kN. The break in Comparative Example was assumed to be the one in the weld nugget. Matrix break such as the one that occurred in Examples 1 to 3 did not occur.

In the cross tensile test of welding structural part 1 in Examples 1 to 3, the breaking force of 4 kN, namely the breaking force in Comparative Example, or higher was obtained easily. By adjusting the high-frequency power for post-heating, the breaking force of the welding structural part 1 of the present invention in a cross tensile test could be made to be 8 kN, which is twice as high as or higher than the breaking force of conventional welding structural part. In other words, the breaking forces of the welding structural part 1 in Examples 1 to 3 were much higher than that of the spot welding conducted by applying low-frequency power supply 16 only. Further, when the carbon content of the steel sheets 2 fell within the range approximately from 0.19% to 0.26 mass %, the breaking force of the welding structural part 1 in Examples 1 to 3 was much higher than that of Comparative Example.

Figure 14:
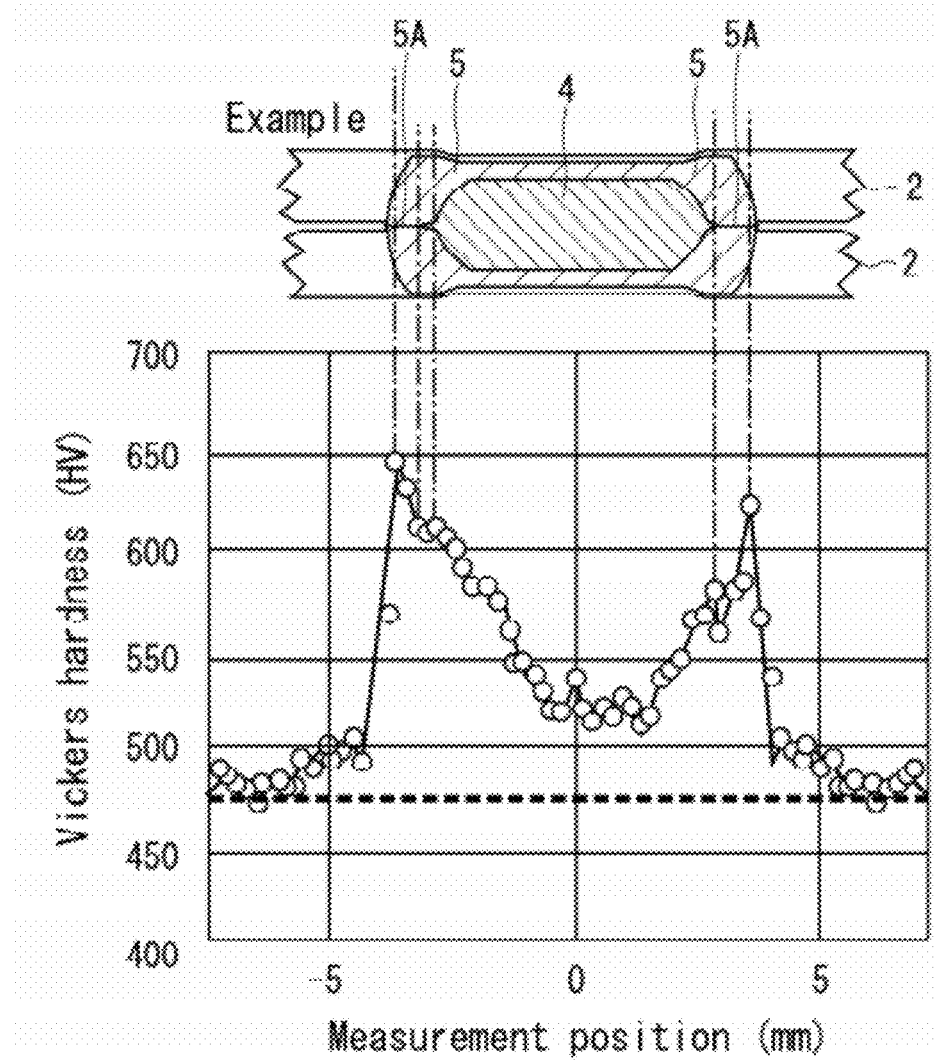
FIG. 14 is a chart illustrating hardness distribution roughly in the central part of the cross section of the spot weld zone of the spot welding structural part manufactured in Example 1.

FIG. 14 is a chart showing a typical hardness distribution roughly in the central part of the cross section of the spot weld zone 3 of the spot welding structural part 1 manufactured in Example 1. The horizontal axis in FIG. 14 represents the positions in the direction along the overlapped portion of the steel sheets 2, 2 in the spot weld zone 3. The positions corresponding to the cross section of the spot weld zone 3 are also shown for comparison. The vertical axis in FIG. 14 represents Vickers hardness (HV). The Vickers hardness (HV) of the steel sheets (base material) 2 before spot welding was 470 HV.

FIG. 14 indicates that the hardness of the left side of the measurement position, namely the hardness of the outside of the left outermost surface of the heat affected zone 5, was 520 to 550 HV, the hardness of the left side of the heat affected zone 5 was 650 to 600 HV, the hardness of the weld nugget 4 was 520 to 600 HV, the hardness of the outside of the right side of the heat affected zone 5 was 550 to 620 HV, and the hardness of the right outermost surface of the heat affected zone 5 was 470 to 500 HV. The hardness distribution in FIG. 14 is a measurement example in Example 1, but similar results were obtained at the other positions in Example 1 and in Examples 2 and 3.

Figure 15:
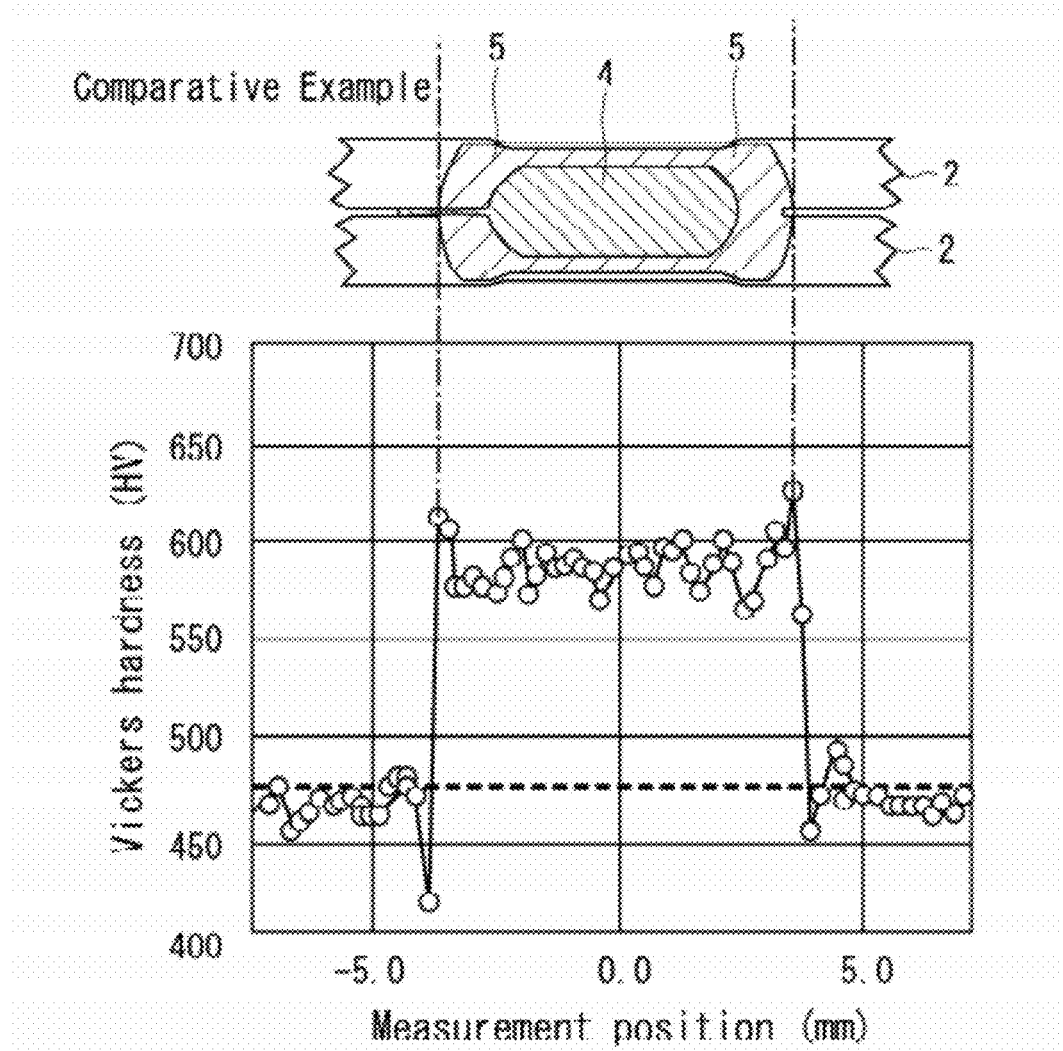
FIG. 15 is a chart illustrating hardness distribution roughly in the central part of cross section of the spot weld zone of the spot welding structural part manufactured in Comparative Example.

FIG. 15 is a chart showing a typical hardness distribution roughly in the central part of the central cross section of the spot weld zone of the spot welding structural part manufactured in Comparative Example. The horizontal and vertical axes in FIG. 15 represent the same items as in FIG. 14.

FIG. 15 indicates that the hardness of the exterior portion of the heat affected zone is 470 HV, which is equivalent to the hardness of the matrix, and the strength of the heat affected zone and the weld nugget fell within the 570 to 620 HV range.

Comparison in hardness distribution in the spot weld zone 3 between Example 1 and Comparative Example revealed that in Example 1, the hardness of the weld nugget 4 and that of the heat affected zone 5 were not uniform, but the hardness decreased as the position shifted from the heat affected zone 5 toward the weld nugget 4, and that the hardness of the central region of the weld nugget 4 was similar to the hardness of the exterior region 6 of the heat affected zone 5. Furthermore, the hardness of the exterior region 6 of the heat affected zone 5 in the spot weld zone 3 in Example 1 was found to be slightly higher than the hardness of the base material. This increase in hardness falls within the 0 to +80 HV range. In addition, as apparent from Example 1 as shown in FIG. 14, the outermost region of the heat affected zone 5 has areas where the hardness is as high as 600 HV to 650 HV, unlike Comparative Example.

Figure 16:
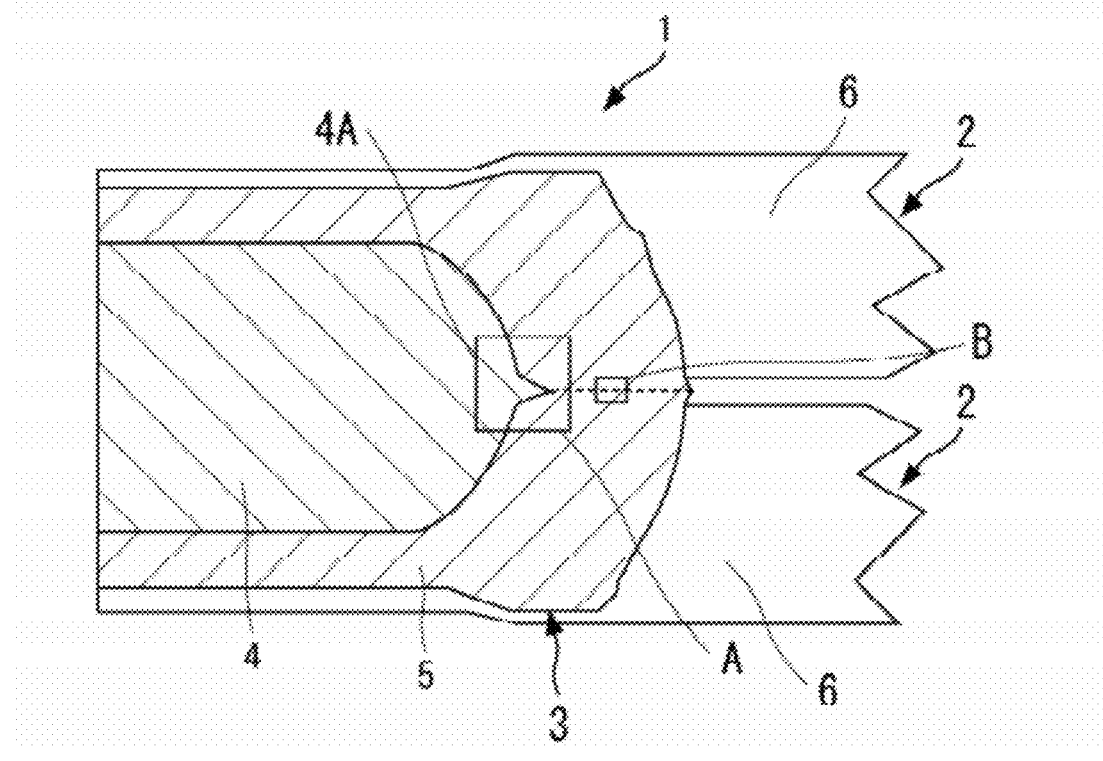
FIG. 16 is a partial cross-sectional view illustrating the spot weld zone in Example 1.
Figure 17:
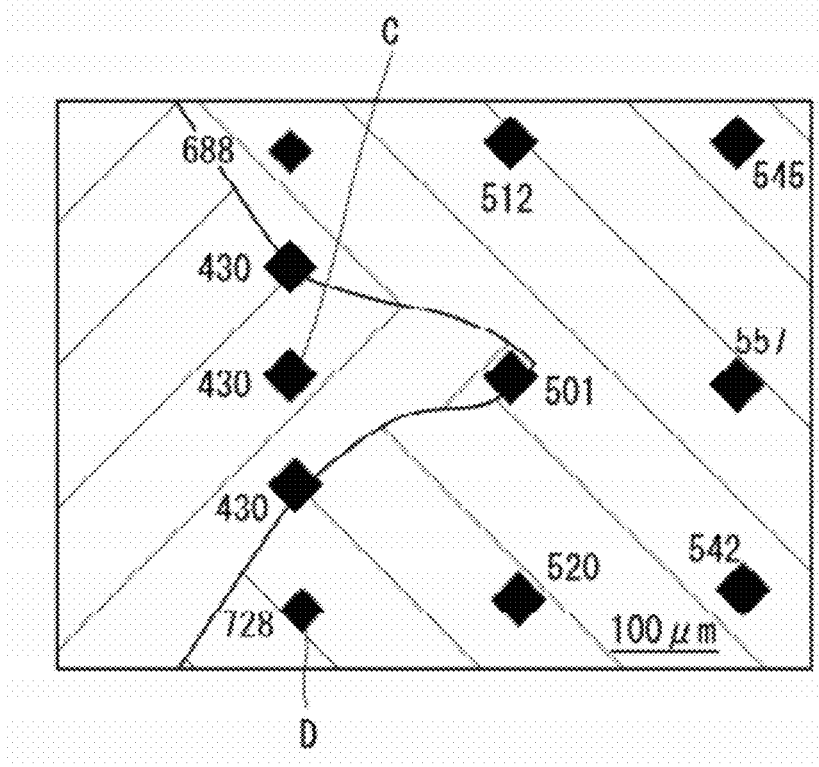
FIG. 17 is a chart showing the results of measurement of hardness in the region shown as A in FIG. 16.

FIG. 16 is a cross-sectional view showing a part of the spot weld zone in Example 1, and FIG. 17 is a chart showing the results of hardness measurement taken in the area as shown as A in FIG. 16.

The hardness distribution in Example 1 as shown in FIG. 14 is a linear distribution along the overlapped portion of the steel sheets 2 including the convex portion 4A. Meanwhile, FIG. 17 shows the results of hardness distribution in a planar form including the weld nugget 4, its convex portion 4A, and the heat affected zone 5. Hardness was measured at 11 points marked as ♦. The hardness at three points within the weld nugget 4, specifically at three points at the root of the convex portion 4A, was approximately 430 HV. There were only three points in the weld nugget 4 where the hardness exceeded 550 HV, and the hardness at the other five points fell within the 501 to 545 HV range. It was found that the hardness at positions other than the above three points was much lower than the average hardness of the weld nugget and the heat affected zone of 589 HV in Comparative Example.

The weld nugget 4 and its convex portion 4A will hereinafter be described in detail.

In the overlapped portion of steel sheets 2, the convex portion 4A of the weld nugget 4 bears the heaviest load, and so the toughness of this portion has significant effect on the fracture characteristics of the weld zone. In the present invention, a convex portion 4A is formed at the edge of the weld nugget 4, and that portion is soft and has a function of relieving stress. With conventional spot welding, the convex portion formed at the edge of the weld nugget, which is called expulsion, is formed as an incidental phenomenon. Therefore, the generation of expulsions were accidental phenomenon and were beyond of control even if the same materials are used. Meanwhile, with the present invention, by heating steel sheets 2 by high-frequency energization, the state of the weld nugget 4 including the convex portion 4A can be controlled.

Comparison between two dimensional planar hardness distribution described by referring to FIG. 17 and the breaking force confirmed by the cross tensile test described by referring to FIG. 13 reveals that the breaking force in the cross tensile test has been improved. The reason for this is estimated as follows: The hardness of the weld nugget 4 and the heat affected zone 5 has decreased to lower than that of the average hardness of the weld nugget and the heat affected zone of 589 HV of Comparative Example, and the toughness has thus been increased.

From the above, there is a possibility that areas having high hardness in the weld nugget 4 and the heat affected zone 5 are scattered within the weld nugget 4 and the heat affected zone 5. In Example 1, the hardness of the area that turns to be a fracture path in conventional spot welding by a load test is suppressed, thereby allowing the microstructure to have high toughness and thus ensuring high bonding strength. Or this microstructure having suppressed hardness and high toughness may be surrounded or confined by portions having higher hardness, and thus high bonding strength may be obtained.

Figure 18:
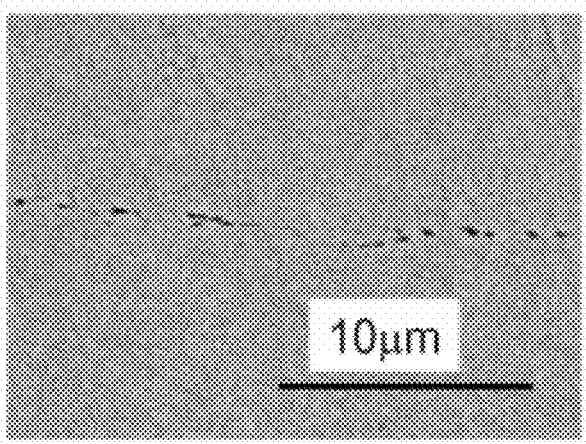
FIG. 18 is a scanning electron microscopic (SEM) image of the microstructure of the heat affected zone shown as B in FIG. 16.

FIG. 18 is a scanning electron microscopic image (SEM image) of the microstructure of the heat affected zone 5 shown as B in FIG. 16. The microstructure on the surface of the weld zone has been made flat by the electropolishing method disclosed in Patent Reference 3 and Non-patent Reference 2.

The area as shown by dotted line in FIG. 18 is the bonded surface of the steel sheets 2, and it is apparent that the steel sheets 2 have been bonded firmly by solid-phase bonding.

Figure 19:
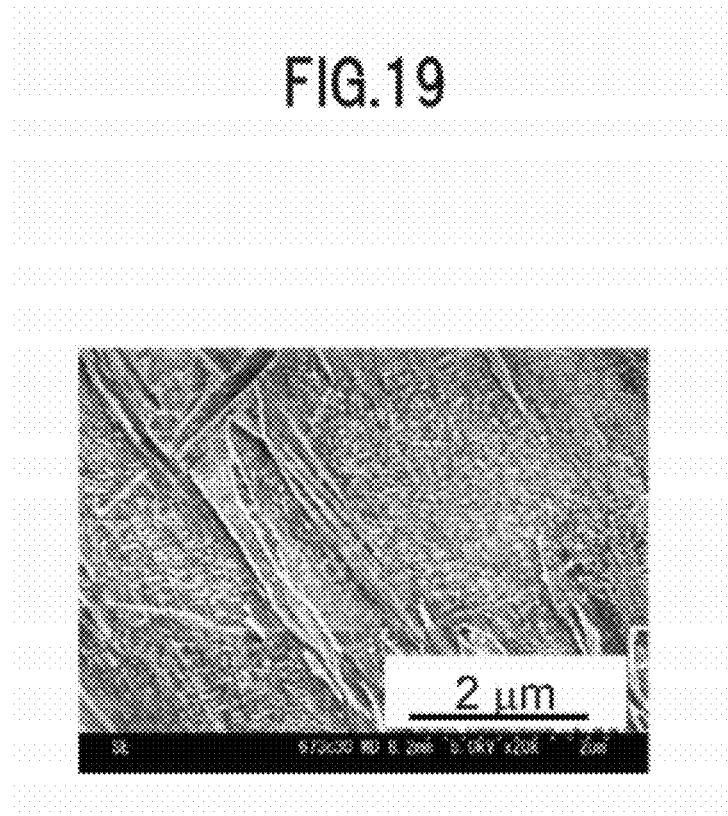
FIG. 19 is an SEM image of the microstructure of the weld nugget shown as C in FIG. 17.
Figure 20:
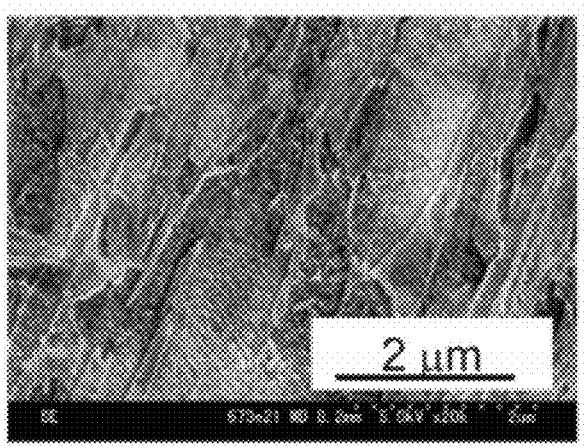
FIG. 20 is an SEM image showing the microstructure at point D where the hardness is the highest within the heat affected zone in FIG. 17.
Figure 21:
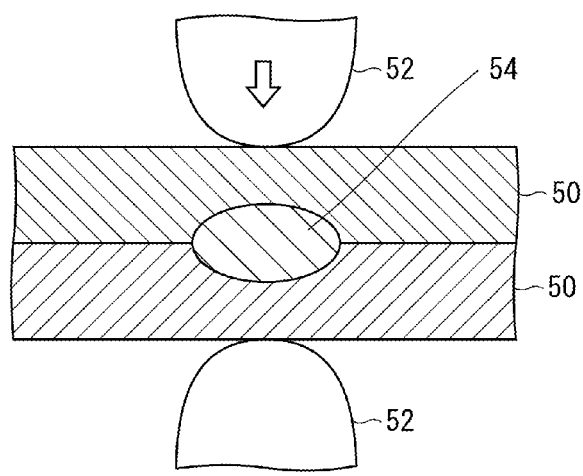
FIG. 21 is a cross-sectional view illustrating the conventional spot welding of steel sheets.

FIG. 19 is an SEM image showing the microstructure of the weld nugget 4 shown as C in FIG. 17. The microstructure on the surface of the weld zone 3 has been made flat by the electropolishing method described by referring to FIG. 18.

As apparent from FIG. 19, the microstructure of the weld nugget 4 having the hardness of 430 HV has martensite where the fine carbides are dispersed. Such state where the fine carbides are dispersed is also effective as a means to ensure both strength and toughness of the martensite, and increasing the dispersion coefficient of particles (=(square root of particle diameter)/mean spacing of particles) is effective to achieve that objective.

FIG. 19 is an SEM image showing the microstructure at point D where the hardness is the highest within the heat affected zone 5 in FIG. 17. The microstructure on the surface of the spot weld zone 3 has been made flat by the electropolilshing method described by referring to FIG. 18.

As apparent from FIG. 19, in the microstructure of the heat affected zone 5 at the position where the hardness is 728 HV, martensite where the fine carbides are dispersed has not been formed.

The present invention is not limited to the embodiments described above, and various variations are possible within the scope of the invention defined in the claim. It goes without saying that they are included in the scope of the present invention. The high-frequency power in the embodiments described above may be used not only for post-heating but also for both pre-heating and post-heating. The application time of low-frequency power and that of high-frequency power may be designed as required to obtain given cross breaking force depending on the carbon composition and shape of steel sheets 2.

What is claimed is:

1. A spot welded structural part, comprising: steel sheets bonded together at an overlapping portion with a weld zone, the weld zone comprising a weld nugget and a heat affected zone surrounding the weld nugget, the weld nugget being a solidified mass melted during spot welding, wherein the weld zone having a hardness gradient where hardness decreases from a bonded edge toward a center of the weld zone, and wherein carbide is dispersed in the weld nugget and the heat affected zone, and a dispersion coefficient of particles expressed by equation (1) shown below is 0.02 or higher, defining that the particle diameter of the carbide dispersed in the weld nugget and the heat affected zone as d and the mean spacing of particles as L:

Dispersion coefficient of particles=(Square root of particle diameter)/Mean spacing of particles= $(d)^{1/2}/L$ (1).

2. A spot welded structural part, comprising: steel sheets bonded together at an overlapping portion with a weld zone, wherein the weld zone comprising: a weld nugget; and a heat affected zone surrounding the weld nugget, the weld nugget being a solidified mass melted during spot welding, wherein the spot welded structural part has a hardness distribution on a weld surface where the hardness increases from an exterior region of the heat affected zone toward the heat affected zone, and then decreases from the heat affected zone toward a center of the weld nugget, and wherein carbide is dispersed in the weld nugget and the heat affected zone, and the dispersion coefficient of particles expressed by equation (1) shown below is 0.02 or higher, defining that the particle diameter of the carbide dispersed in the weld nugget and the soft region the heat affected zone as d and the mean spacing of particles as L:

Dispersion coefficient of particles=(Square root of particle diameter)/Mean spacing of particles= $(d)^{1/2}/L$ (1).

3. The welding structural part as set forth in claim 2, wherein when the maximum increment in hardness of the steel sheets in the heat affected zone is H, the hardness at the central portion of the weld nugget is softer than the hardest part of the heat affected zone by at least ½ of H.

4. The welding structural part as set forth in claim 2, wherein the heat affected zone has a fine dual-phase microstructure consisting of a hard phase having a hardness of 550 HV or more and a soft phase having a hardness of 470 to 550 HV.

5. The welding structural part as set forth in claim 2, wherein the microstructure of the weld nugget is martensite where fine carbides are dispersed.

6. The welding structural part as set forth in claim 2, wherein the particle diameter of the carbide is 10 nm or larger.

7. The welding structural part as set forth in claim 2, wherein the particle volume fraction of the carbide falls within the 1% to 10% range.

8. The welding structural part as set forth in claim 2, wherein the steel sheets in the heat affected zone are bonded by solid-phase bonding.

9. The welding structural part as set forth in claim 8, wherein the solid-phase bonding of the heat affected zone has bonding strength that allows a crack to run along a region other than the weld nugget, or along a proximity region of the boundary between the weld nugget and the heat affected zone, as a fracture path in a cross tensile test of the weld zone.

10. The welding structural part as set forth in claim 2, wherein the weld nugget has a convex portion bulging into the heat affected zone along the overlapped portion within the boundary region of the weld nugget and the heat affected zone.

11. The welding structural part as set forth in claim 2, wherein the steel sheets contains carbon in 0.15 mass % or more.

12. The welding structural part as set forth in claim 2, wherein a crack runs along a region other than the weld nugget, or along a proximity region of the boundary between the weld nugget and the heat affected zone, as a fracture path in a cross tensile test of the weld zone.

* * * * *